(12) United States Patent
Hasegawa

(10) Patent No.: US 11,440,197 B2
(45) Date of Patent: Sep. 13, 2022

(54) ROBOT SYSTEM AND IMAGING METHOD

(71) Applicant: Seiko Epson Corporation, Tokyo (JP)

(72) Inventor: Fumiaki Hasegawa, Azumino (JP)

(73) Assignee: Seiko Epson Corporation

( * ) Notice: Subject to any disclaimer, the term of this patent is extended or adjusted under 35 U.S.C. 154(b) by 265 days.

(21) Appl. No.: 16/838,274

(22) Filed: Apr. 2, 2020

(65) Prior Publication Data
US 2020/0316783 A1    Oct. 8, 2020

(30) Foreign Application Priority Data

Apr. 3, 2019    (JP) .............................. JP2019-071166

(51) Int. Cl.
*B25J 9/16* (2006.01)
*B25J 19/02* (2006.01)

(52) U.S. Cl.
CPC ........... *B25J 9/1697* (2013.01); *B25J 9/1612* (2013.01); *B25J 9/1669* (2013.01); *B25J 19/023* (2013.01)

(58) Field of Classification Search
CPC ... B25J 9/1679; B25J 9/06; B25J 9/161; B25J 9/1674; B25J 13/085; B25J 19/02; B25J 5/007; B25J 5/02
See application file for complete search history.

(56) References Cited

U.S. PATENT DOCUMENTS

| | | | |
|---|---|---|---|
| 9,120,622 B1* | 9/2015 | Elazary | B25J 9/1697 |
| 10,504,056 B1* | 12/2019 | Stubbs | G06Q 10/087 |
| 10,525,593 B1* | 1/2020 | Shi | B65G 1/04 |
| 2016/0325933 A1* | 11/2016 | Stiernagle | B65G 1/10 |
| 2017/0173789 A1* | 6/2017 | Kilibarda | B25J 19/023 |
| 2020/0016770 A1* | 1/2020 | Kamranzadeh | B25J 9/0009 |
| 2020/0189845 A1* | 6/2020 | Klinge | B25J 9/107 |

FOREIGN PATENT DOCUMENTS

| | | | |
|---|---|---|---|
| JP | 2018-008343 A | 1/2018 | |
| JP | 2018-089721 A | 6/2018 | |

* cited by examiner

*Primary Examiner* — Adam R Mott
*Assistant Examiner* — John F Hobbs, III
(74) *Attorney, Agent, or Firm* — Harness, Dickey & Pierce, P.L.C.

(57) ABSTRACT

A robot system includes a gripping section configured to grip a storing section, a first arm in which the gripping section is provided, the first arm drawing out the storing section from a shelf in which the storing section is housed, a force detecting section provided in the first arm and configured to detect force applied to the gripping section, an imaging section configured to image the storing section, and a control section configured to control the gripping section and the first arm. The control section performs control for drawing out the storing section from the shelf with the first arm and thereafter tilting the storing section with respect to the shelf with the gripping section or the first arm.

10 Claims, 13 Drawing Sheets

ROBOT SYSTEM AND IMAGING METHOD

The present application is based on, and claims priority from JP Application Serial Number 2019-071166, filed Apr. 3, 2019, the disclosure of which is hereby incorporated by reference herein in its entirety.

BACKGROUND

1. Technical Field

The present disclosure relates to a robot system and an imaging method.

2. Related Art

As an apparatus that automatically holds an article and moves, there has been known an unmanned machine including a camera and a suction pad at the distal end of a robot arm. The unmanned machine photographs a target article with the camera, performs image processing to detect the shape and the position of the article, and sucks the article with the suction pad.

For example, JP A-2018-89721 (Patent Literature 1) describes a technique for imaging an article storage shelf and a drawer with a camera and drawing out the drawer from the article storage shelf using a captured image.

For example, JP A-2018-8343 (Patent Literature 2) describes a technique for picking up a component on the inside of a movable tray using an image captured by imaging the inside of the movable tray with a camera and a technique for tilting the movable tray to move the component.

However, in Patent Literature 1 and Patent Literature 2, when imaging components, it is likely that a component present at a blind spot of the camera cannot be imaged.

SUMMARY

A robot system according to an aspect of the present disclosure includes: a gripping section configured to grip a storing section; a first arm in which the gripping section is provided, the first arm drawing out the storing section from a shelf in which the storing section is housed; a force detecting section provided in the first arm and configured to detect force applied to the gripping section; an imaging section configured to image the storing section; and a control section configured to control the gripping section and the first arm. The control section performs control for drawing out the storing section from the shelf with the first arm and thereafter tilting the storing section with respect to the shelf with the gripping section or the first arm.

In the robot system, in drawing out the storing section from the shelf with the first arm or tilting the storing section with the gripping section or the first arm, when the force detecting section detects a predetermined output value, the control section may suspend the control for drawing out the storing section from the shelf or the control for tilting the storing section.

In the robot system, when a direction for drawing out the storing section from the shelf is represented as an X axis, a direction orthogonal to the X axis and parallel to a bottom surface of the storing section in a state in which the storing section is housed in the shelf is represented as a Y axis, and a direction orthogonal to the X axis and the Y axis is represented as a Z axis, in the control for tilting the storing section, the control section may turn the storing section around the X axis or turn the storing section around the Y axis with the gripping section or the first arm.

In the robot system, the imaging section may be disposed above the storing section in a vertical direction, and, before performing the control for tilting the storing section with the gripping section or the first arm, the control section may perform control for turning, with the gripping section or the first arm, the storing section around the Y axis such that a part of the storing section gripped by the gripping section approaches the imaging section.

In the robot system, the robot system may further include a storing section in which a distance for drawing out the storing section from the shelf with the first arm is stored in advance.

In the robot system, the robot system may further include a second arm in which the imaging section is provided, the imaging section may include an imaging surface, and the control section may move the second arm in a direction for reducing an angle formed by a straight line orthogonal to the imaging surface and a normal of the bottom surface of the storing section.

An imaging method according to an aspect of the present disclosure is an imaging method by a robot including a gripping section configured to grip a storing section, a first arm in which the gripping section is provided, the first arm drawing out the storing section from a shelf in which the storing section is housed, a force detecting section provided in the first arm and configured to detect force applied to the gripping section, and an imaging section configured to image the storing section, the imaging method including: gripping, with the gripping section, the storing section housed in the shelf; drawing out the storing section from the shelf with the first arm; imaging the storing section with the imaging section; detecting a bottom surface of the storing section based on a result of the imaging and calculating a normal of the bottom surface; tilting, when it is determined that the normal and an optical axis of the imaging section are not parallel, with the gripping section or the first arm, the storing section in a direction for reducing an angle formed by the optical axis and the normal; suspending the drawing out and the tilting when the force detecting section detects a predetermined output value in the drawing out and the tilting; and imaging an inside of the storing section with the imaging section.

In the imaging method, in the tilting, the storing section may be tilted until the angle formed by the optical axis and the normal is reduced to 0°.

In the imaging method, the imaging method may further include restoring, after the suspending, the storing section from the suspension of the tilting and tilting the storing section in a direction for increasing the angle formed by the optical axis and the normal.

In the imaging method, the drawing out, the tilting, and the suspending may be repeated until the angle formed by the optical axis and the normal reaches a predetermined angle.

In the imaging method, in the drawing out, when the storing section collides with an object around the storing section and a force in a direction from the object toward the storing section is detected by the force detecting section, the storing section may be moved in the direction from the object toward the storing section by the first arm.

DESCRIPTION OF EXEMPLARY EMBODIMENTS

An embodiment embodying the present disclosure is explained below with reference to the drawings. The drawings referred to below are enlarged or reduced as appropriate such that portions to be explained are shown in a recognizable state.

First Embodiment

Overview of a First Robot System

Figure 1:
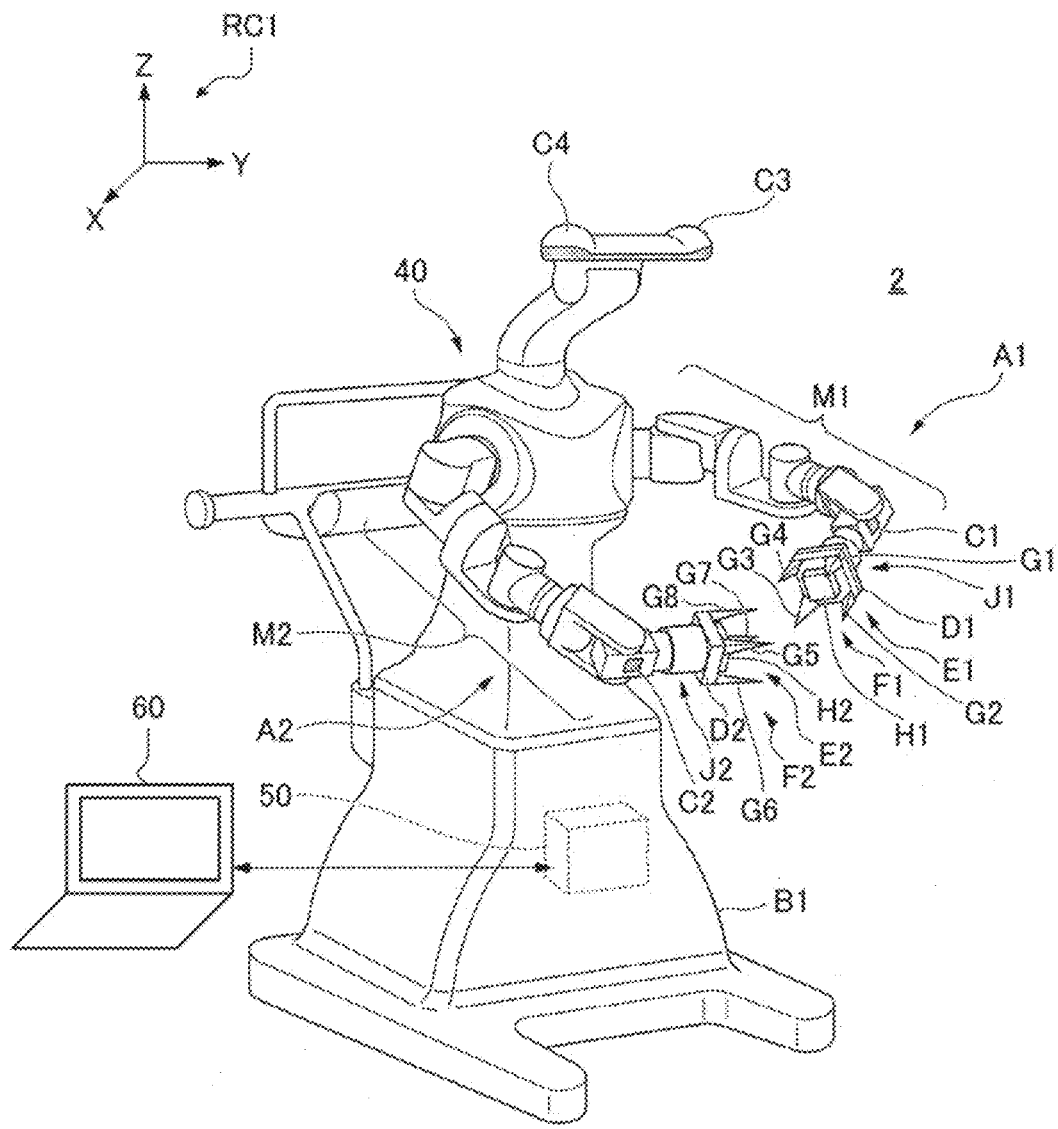
FIG. 1 is a diagram showing an example of the configuration of a first robot system according to a first embodiment.

FIG. 1 is a diagram showing an example of the configuration of a first robot system 2 according to a first embodiment.

The first robot system 2 functioning as a robot system according to this embodiment includes a first robot 40 functioning as a robot and a first information processing device 60. The first robot 40 incorporates a first robot control device 50 functioning as a control section. The first robot system 2 may not include the first information processing device 60.

Instead of incorporating the first robot control device 50, the first robot 40 may be controlled by the first robot control device 50 set on the outside of the first robot 40. In this case, the first robot system 2 includes the first robot 40 and the first robot control device 50.

The first robot system 2 may include, in addition to both of the first robot 40 and the first information processing device 60, another device such as an imaging section separate from the first robot 40.

In the following explanation, for convenience of explanation, a positive direction of the Z axis in a first robot coordinate system RC1 shown in FIG. 1 is referred to as upward direction or upward and a negative direction of the Z axis is referred to as downward direction or downward. The first robot coordinate system RC1 means a robot coordinate system of the first robot 40. In the following explanation, as an example, the negative direction of the Z axis in the first robot coordinate system RC1 and the vertical direction coincide. The negative direction and the vertical direction may not coincide.

The first robot 40 is a double-arm robot including a first arm A1, a second arm A2, a first supporting stand B1 that supports the first arm A1 and the second arm A2, and a first robot control device 50 provided on the inner side of the first supporting stand B1. The first robot 40 may be, instead of the double-arm robot, a plural-arm robot including a three or more arms or single-arm robot including one arm. The first robot 40 may be other robots such as a SCARA (horizontal articulated) robot, an orthogonal coordinate robot, and a cylindrical robot. The orthogonal coordinate robot is, for example, a gantry robot.

When the first robot 40 is set on a certain surface, the first supporting stand B1 is divided into two portions along a direction orthogonal to the surface. In the following explanation, for convenience of explanation, the surface on which the first robot 40 is set is referred to as setting surface. In the following explanation, as an example, the setting surface is parallel to an XY plane, which is a surface including the X axis and the Y axis in the first robot coordinate system RC1 shown in FIG. 1, that is, orthogonal to the Z axis in the first robot coordinate system RC1. The setting surface may be nonparallel to the XY plane, that is, may not be orthogonal to the Z axis. The first supporting stand B1 may not be divided or may be divided into three or more portions. Of the two portions, a portion far from the setting surface is capable of turning with respect to a position close from the setting surface. A turning surface of the turning of the far portion is, for example, parallel to the setting surface. The turning surface may be nonparallel to the setting surface.

The first arm A1 includes a first end effector E1 functioning as a gripping section, a first manipulator M1, and a first force detecting section J1 functioning as a force detecting section.

The first end effector E1 is an end effector that holds an object.

The first manipulator M1 includes seven joints and a first imaging section C1. The seven joints respectively include not-shown actuators. In other words, the first arm A1 including the first manipulator M1 is an arm of a seven-axis vertical articulated arm. The first arm A1 performs operation of a degree of freedom of seven axes according to cooperated operation by the first supporting stand B1, the first end effector E1, the first manipulator M1, and the actuators of the respective seven joints. The first arm A1 may operate at a degree of freedom of six or less axes or may be configured to operate at a degree of freedom of eight or more axes.

When the first arm A1 operates at a degree of freedom of seven axes, postures that the first arm A1 can take increases compared with when the first arm A1 operates at a degree of freedom of six or less axes. Consequently, for example, the first arm A1 operates smoothly. Further, the first arm A1 can easily avoid interference with an object present around the first arm A1. When the first arm A1 operates at a degree of freedom of seven axes, the control of the first arm A1 is easy because the computational complexity of the control of the first arm A1 is small compared with when the first arm A1 operates at a degree of freedom of eight or more axes.

The first imaging section C1 is, for example, a camera including a CCD (Charge Coupled Device), a CMOS (Complementary Metal Oxide Semiconductor), or the like as an imaging element that converts condensed light into an electric signal. In this example, the first imaging section C1 is included in a part of the first manipulator M1. Therefore, the first imaging section C1 moves according to the movement of the first manipulator M1. In other words, an imageable range of the first imaging section C1 changes according to the movement of the first arm A1.

The first force detecting section J1 is provided between the first end effector E1 and the first manipulator M1. The first force detecting section J1 detects an external force acting on the first end effector E1 or an external force acting on an object held by the first end effector E1. A predetermined output value detected by the first force detecting section J1 means an output value generated when a container 10 functioning as a storing section shown in FIG. 5 explained below comes into contact with a shelf 14 or the like. The first force detecting section J1 may be, for example, a force sensor, a pressure sensor, or a torque sensor.

The first end effector E1 includes a first base D1, a first finger section F1, and a first palm section H1. In this embodiment, the first finger section F1 includes a first finger G1, a second finger G2, a third finger G3, and a fourth finger G4, which are four fingers.

The first base D1 is attached to the first manipulator M1 via the first force detecting section J1.

Illustration of the first end effector E1 and a second end effector E2 is simplified. However, the first end effector E1 and the second end effector E2 have structure capable of performing operation explained in this embodiment.

The first base D1 includes a flat surface on the opposite side of the first force detecting section J1 side. The first finger G1, the second finger G2, the third finger G3, and the fourth finger G4, which are the four fingers, are disposed on the surface. In this embodiment, the surface has a square shape. The first finger G1, the second finger G2, the third finger G3, and the fourth finger G4 are respectively disposed near the four vertexes of the square. Each of the first finger G1, the second finger G2, the third finger G3, and the fourth finger G4 can be moved relatively to the first base D1. In this embodiment, the first finger G1, the second finger G2, the third finger G3, and the fourth finger G4, which are the four fingers, can grip an object by, while keeping a relative positional relation between two fingers adjacent to each other and keeping a relative positional relation between the other two fingers, bringing these sets of the two fingers close to each other and can release the object by moving the sets of the two fingers away from each other. The releasing the object means releasing the gripped object.

As another configuration, the first finger G1, the second finger G2, the third finger G3, and the fourth finger G4, which are the four fingers, can grip the object by, for example, bringing the four fingers close to one another toward the center or the like of the square and can release the object by moving the four fingers away from the center of the square. As the configuration and the operation of the first finger section F1, any configuration and any operation may be used. For example, the number of fingers included in the first finger section F1, the movement of the fingers, or the like may be optional. Each of the fingers may include, for example, bendable one or more joints.

On the surface, the first palm section H1 is disposed in the center surrounded by the first finger G1, the second finger G2, the third finger G3, and the fourth finger G4, which are the four fingers. In this embodiment, the first palm section H1 includes, as a surface, a surface parallel to the surface of the first base D1. The first palm section H1 can be moved relatively to the first base D1. In this embodiment, the first palm section H1 can perform a pushing operation in a direction opposite to a direction from the first base D1 toward the first force detecting section J1 according to an increase in the distance between the surface of the first base D1 and the surface of the first palm section H1. Conversely, the first palm section H1 can perform a pulling operation in a direction from the first base D1 toward the first power detecting section J1 according to a decrease in the distance between the surface of the first base D1 and the surface of the first palm section H1.

The second arm A2 has the same configuration as the configuration of the first arm A1. In other words, the second end effector E2 has the same configuration as the configuration of the first end effector E1. A second manipulator M2 has the same configuration as the configuration of the first manipulator M1. The second manipulator M2 includes a second imaging section C2 functioning as an imaging section. The second imaging section C2 has the same configuration as the configuration of the first imaging section C1. A second force detecting section J2 has the same configuration as the configuration of the first force detecting section J1.

The second end effector E2 includes a second base D2, a second finger section F2, and a second palm section H2. In this embodiment, the second finger section F2 includes a fifth finger G5, a sixth finger G6, a seventh finger G7, and an eighth finger G8, which are four fingers.

In this embodiment, the first end effector E1 includes a first finger section F1. However, claws may be used instead of the fingers. The same applies to the second end effector E2.

The second arm A2 may have a configuration different from the configuration of the first arm A1. In other words, the second end effector E2 may have a configuration different from the configuration of the first end effector E1. The second manipulator M2 may have a configuration different from the configuration of the first manipulator M1. The second imaging section C2 may have a configuration different from the configuration of the first imaging section C1. The second force detecting section J2 may have a configuration different from the configuration of the first force detecting section J1.

The first robot 40 includes a third imaging section C3 and a fourth imaging section C4 functioning as imaging sections.

The third imaging section C3 is, for example, a camera including a CCD, a CMOS, or the like as an imaging element that converts condensed light into an electric signal. The third imaging section C3 is provided in a part where the third imaging section C3 is capable of stereoscopically imaging, together with the fourth imaging section C4, a range imageable by the fourth imaging section C4.

The fourth imaging section C4 is, for example, a camera including a CCD, a CMOS, or the like as an imaging element that converts condensed light into an electric signal. The fourth imaging section C4 is provided in a part where the forth imaging section C4 is capable of stereoscopically imaging, together with the third imaging section C3, a range imageable by the third imaging section C3.

Each of the functional sections, that is, the first end effector E1, the second end effector E2, the first manipulator M1, the second manipulator M2, the first imaging section C1 to the fourth imaging section C4, the first force detecting section J1, and the second force detecting section J2 included in the first robot 40 is communicably connected to the first robot control device 50 by a cable. Consequently, each of the functional sections performs operation based on a control signal acquired from the first robot control device 50. Wired communication via the cable is performed according to a standard such as Ethernet (registered trademark) or USB (Universal Serial Bus). A part or all of the functional sections may be coupled to the first robot control device 50 by wireless communication performed according to a communication standard such as Wi-Fi (registered trademark). The first robot 40 may not include a part or all of the first imaging section C1, the second imaging section C2, the third imaging section C3, and the fourth imaging section C4.

The first robot control device 50 controls the first robot 40. In the following explanation, as an example, a control method for the first arm A1 by the first robot control device 50 and a control method for the second arm A2 by the first robot control device 50 are the same method. Therefore, in the following explanation, the control of the first robot 40 by the first robot control device 50 is explained using, as an example, the control method for the first arm A1 by the first robot control device 50. The control method for the first arm A1 by the first robot control device 50 and the control method for the second arm A2 by the first robot control device 50 may be partially or entirely different from each other.

The first robot control device 50 acquires, from the first force detecting section J1, information indicating a result of the detection by the first force detecting section J1 and operates the first arm A1 with force control based on the acquired information. The force control means compliant motion control such as impedance control.

The first robot control device 50 acquires, from the second force detecting section J2, information indicating a result of the detection by the second force detecting section J2 and operates the second arm A2 with force control based on the acquired information. The force control means compliant motion control such as impedance control.

The first robot control device 50 operates the first arm A1 with the processing explained above. The first robot control device 50 operates the second arm A2 with the same processing as the processing explained above. The first robot control device 50 operates at least one of the first arm A1 and the second arm A2 and causes the first robot 40 to perform predetermined work. The predetermined work may be any work. The first robot control device 50 may be configured to operate at least one of the first arm A1 and the second arm A2 with other processing in addition to the processing explained above.

The first information processing device 60 is an information processing device such as a notebook PC (Personal Computer), a tablet PC, a desktop PC, a work station, a multifunction cellular phone terminal (a smart phone), a cellular phone terminal, or a PDA (Personal Digital Assistant). The first information processing device 60 may be a teaching pendant.

The first information processing device 60 generates various kinds of information such as an operation program and teaching point information according to operation received from a user. The first information processing device 60 outputs the generated information to the first robot control device 50 and causes the first robot control device 50 to store the information to thereby, for example, teach the information to the first robot control device 50. Even when the first robot control device 50 is in an offline state, the first information processing device 60 can output the generated information to the first robot control device 50 and cause the first robot control device 50 to store the information.

The first information processing device 60 is communicably connected to the first robot control device 50 by a cable. Wired communication via the cable is performed according to a standard such as Ethernet (registered trademark) or USB. The cable connecting the first information processing device 60 and the first robot control device 50 is an example of a line by wire among lines communicably connecting the first information processing device 60 and the first robot control device 50. The first information processing device 60 may be connected to the first robot control device 50 by wireless communication performed according to a communication standard such as Wi-Fi (registered trademark). In this case, Wi-Fi (registered trademark) is an example of a line by radio among the lines communicably connecting the first information processing device 60 and the first robot control device 50.

Hardware Configuration of the First Robot Control Device

A hardware configuration of the first robot control device 50 is explained below with reference to FIG. 2.

Figure 2:
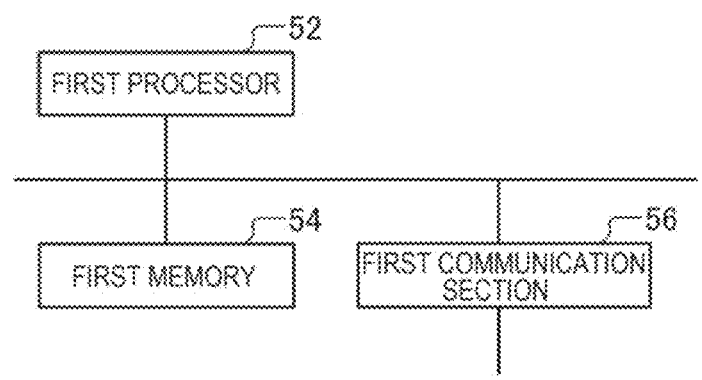
FIG. 2 is a diagram showing an example of a hardware configuration of a first robot control device.

FIG. 2 is a diagram showing an example of the hardware configuration of the first robot control device 50.

The first robot control device 50 includes a first processor 52, a first memory 54 functioning as a storing section, and a first communication section 56. The first robot control device 50 performs communication with the first information processing device 60 via the first communication section 56. These components are communicably connected to one another via a bus.

The first processor 52 is, for example, a CPU (Central Processing Unit). The first processor 52 may be another processor such as an FPGA (Field Programable Gate Array) instead of the CPU. The first processor 52 executes various programs stored in the first memory 54.

The first memory 54 includes a HDD (Hard Disk Drive), an SSD (Solid State Drive), an EEPROM (Electrically Erasable Programmable Read-Only Memory), a ROM (Read-Only Memory), or a RAM (Random Access Memory). The first memory may be an external storage device connected by, for example, a digital input/output port such as USB instead of a storage device incorporated in the first robot control device 50. The first memory 54 stores various kinds of information, various images, an operation program, and the like to be processed by the first robot control device 50. The first memory 54 may be configured by one storage device or may be configured by a plurality of storage devices.

The first communication section 56 includes a digital input/output port such as USB or an Ethernet (registered trademark) port. The first robot control device 50 may include one or both of an input device such as a keyboard, a mouse, or a touch pad and a display device including a display.

Hardware Configuration of the First Information Processing Device

A hardware configuration of the first information processing device 60 is explained with reference to FIG. 3.

Figure 3:
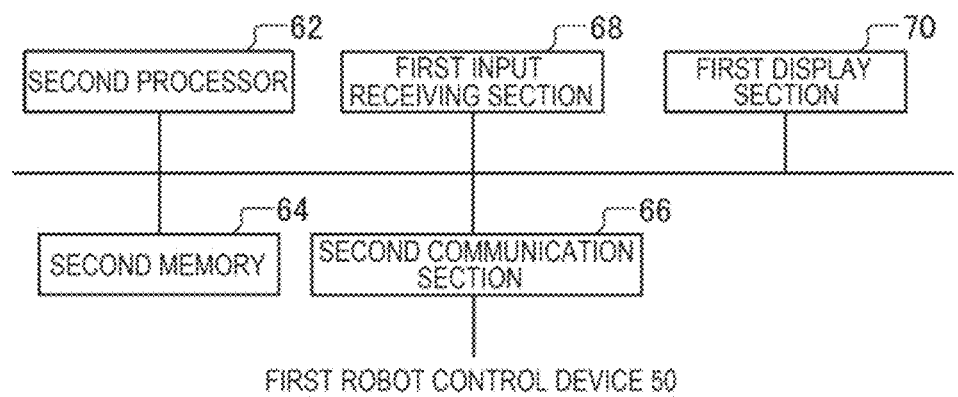
FIG. 3 is a diagram showing an example of a hardware configuration of a first information processing device.

FIG. 3 is a diagram showing an example of the hardware configuration of the first information processing device 60.

The first information processing device 60 includes a second processor 62, a second memory 64, a second communication section 66, a first input receiving section 68, and a first display section 70. The first information processing device 60 performs communication with the first robot control device 50 via the second communication section 66. These components are communicably coupled to one another via a bus.

The configuration of the second processor 62 is the same as the configuration of the first processor 52. Therefore, explanation of the configuration of the second processor 62 is omitted. The second processor 62 may be configured by a CPU included in one information processing device, in this example, the first information processing device 60 or may be configured by CPUs included in a plurality of information processing devices.

The configuration of the second memory 64 is the same as the configuration of the first memory 54. Therefore, explanation of the configuration of the second memory 64 is omitted. When the second memory 64 is configured by a plurality of storage devices, a storage device included in an information processing device separate from the first information processing device 60 may be included in the plurality of storage devices.

The configuration of the second communication section 66 is the same as the configuration of the first communication section 56. Therefore, explanation of the configuration of the second communication section 66 is omitted.

The first input receiving section 68 is an input device such as a keyboard, a mouse, or a touch pad. The first input receiving section 68 may be a touch panel configured integrally with the first display section 70.

The first display section 70 is, for example, a liquid crystal display panel or an organic EL (Electro Luminescence) display panel.

Functional Configuration of the First Robot Control Device

A functional configuration of the first robot control device 50 is explained below with reference to FIG. 4.

Figure 4:
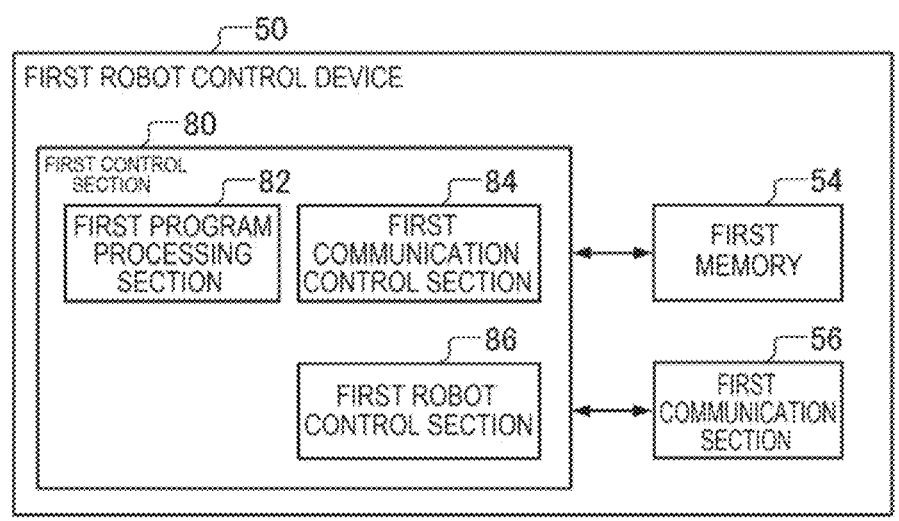
FIG. 4 is a diagram showing an example of a functional configuration of the first robot control device.

FIG. 4 is a diagram showing an example of the functional configuration of the first robot control device 50.

The first robot control device 50 includes the first memory 54, the first communication section 56, and a first control section 80. The first memory 54 and the first communication section 56 are the same as those shown in FIG. 2.

The first control section 80 controls the entire first robot control device 50. The first control section 80 includes a first program processing section 82, a first communication control section 84, and a first robot control section 86. These functional sections included in the first control section 80 are realized by, for example, the first processor 52 executing various commands stored in the first memory 54. The commands are, for example, programs and commands included in the programs. A part or all of the functional sections may be hardware functional sections such as an LSI and an ASIC.

In the control of the first arm A1, the first program processing section 82 reads out, from the first memory 54, the operation program stored in the first memory 54. The first program processing section 82 performs the control of the first arm A1 based on the read-out operation program. In the control of the second arm A2, the first program processing section 82 performs the same processing as the processing performed in the control of the first arm A1.

The first communication control section 84 controls communication with the first information processing device 60 performed via the first communication section 56.

The first robot control section 86 is controlled by the first program processing section 82 to communicate a predetermined signal between the first robot control section 86 and the first arm A1 to control the operation of the first arm A1. In other words, the first robot control section 86 controls the operation of the first arm A1 such that a form of the control of the first arm A1 determined by the first program processing section 82 is realized. In the control of the second arm A2, the first robot control section 86 performs the same processing as the processing performed in the control of the first arm A1.

Explanation of Force Control

Force control is explained using the first arm A1 as an example. The same applies to the second arm A2.

The first force detecting section J1 is provided between the first end effector E1 and the first manipulator M1. The first force detecting section J1 includes, for example, four force detecting elements including quartz. The first force detecting section J1 detects, based on shearing forces applied to the quartz of the respective force detecting elements, an external force acting on a hand of the first robot 40.

The hand of the first robot 40 means the first end effector E1. The first force detecting section J1 detects an external force acting on the first end effector E1 or an object gripped by the first end effector E1. At this time, as another understanding, the object gripped by the first end effector E1 may be regarded as the hand of the first robot 40. The external force includes a translational force that translates the hand. The translational force includes three translational forces acting in the directions of respective three axes orthogonal to one another in a force detection coordinate system. The force detection coordinate system means a three-dimensional orthogonal coordinate system associated with the first force detecting section J1. The external force includes a turning (rotation) moment (torque) that turns the hand. The turning moment includes three turning moments acting around the respective three axes in the force detection coordinate system. In other words, the first force detecting section J1 detects the respective three translational forces and the respective three turning moments as external forces. The first force detecting section J1 outputs information indicating respective six output values, that is, output values corresponding to the detected respective three translational forces and output values corresponding to the respective three turning moments to the first robot control device 50 as external force detection information. In other words, a part or all of the six output values are an example of an output value output from the first force detecting section J1.

The external force detection information is used for force control of the first robot 40 by the first robot control device 50. The force control means control based on the output value output from the first force detecting section J1, that is, control based on the external force detection information output from the first force detecting section J1 to the first robot control device 50 and means, for example, compliant motion control such as impedance control.

The first force control section J1 may include three or less force detecting elements including quartz or may include five or more force detecting elements including quartz. The first force detecting section J1 may include a force detecting element not including quartz instead of a part or all of the four force detecting elements including quartz. The first force detecting section J1 may include a force detecting element not including quartz in addition to a part or all of the four force detecting elements including quartz.

In this way, as the first force detecting section J1, a force detecting section including quartz has high accuracy. However, a force detecting section having another configuration may be used.

The first robot control device 50 acquires the external force detection information from the first force detecting section J1 and operates the first arm A1 with force control based on the acquired external force detection information and the operation program. In the force control, the first robot control device 50 operates the first arm A1 and changes the position and the posture of a predetermined control point such that one or more output values designated by the operation program among the six output values indicated by the external force detection information coincide with a target value designated by the operation program. In this case, the first robot control device 50 calculates, by solving an equation of motion corresponding to the force control, respective changes of the position and the posture of the control point at the time when the position and the posture of the control point are changed such that the one or more output values coincide with the target value. For example, when impedance control is used as the force control, the equation of motion is an equation of motion corresponding to the impedance control. Detailed explanation of the equation of motion corresponding to the force control is omitted because the equation of motion corresponding to the force control is publicly known.

In Patent Literature 2, since the force detecting section is not used in the tilting work for the movable tray, it is likely that, for example, application of a load to the movable tray cannot be detected. In this embodiment, since the first force detecting section J1 is used, it is possible to prevent a container from being damaged even if the container is caught by a shelf or another container in drawing-out work explained below.

Figure 5:
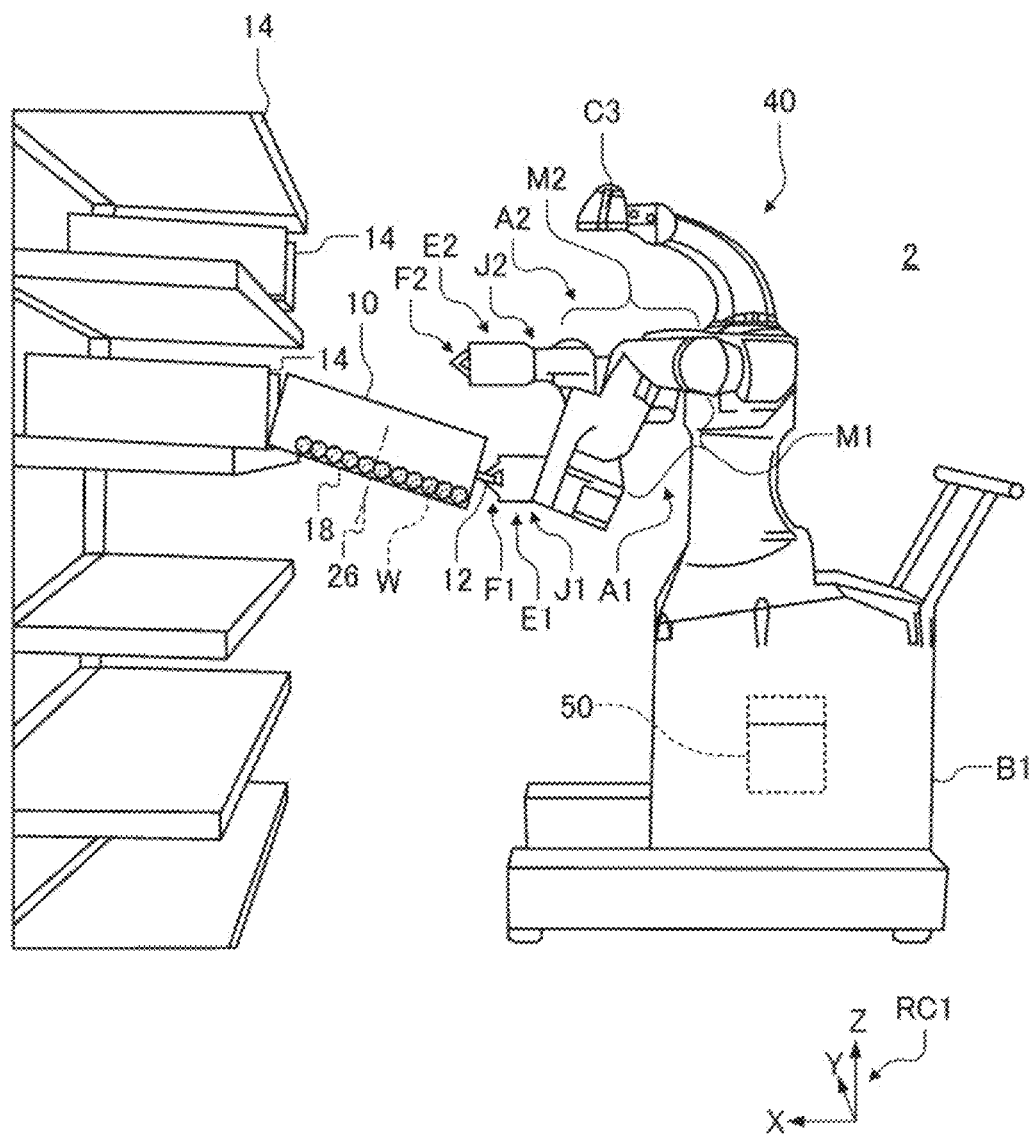
FIG. 5 is a diagram showing an example of the configuration of the first robot system according to the first embodiment.

FIG. 5 is a diagram showing an example of the configuration of the first robot system 2 according to this embodiment.

With the configuration shown in FIG. 5, the first robot system 2 according to this embodiment images, with the third imaging section C3, work W on the inside of the container 10 housed in the shelf 14. The first robot system 2 performs image processing of a captured image and detects the shape and the position of the work W. The first robot system 2 grips the work W with the second end effector E2. "Housed" described above means a state in which at least the container 10 is placed on the shelf 14. In other words, if not only the shelf 14 but also a member on which the container 10 is placed is present, the container 10 placed on the member is simply represented as the container 10 housed in the shelf 14.

In that case, in order to image the work W on the inside of the container 10 with the third imaging section C3, the first robot system 2 tilts the container 10 with the first end effector E1 or the first arm A1.

The shelf 14 is a member or a rack that houses the container 10. The shelf 14 is placed in front of the first robot 40. In the shelf 14, for example, the work W, tools, and the like are arranged and placed for each of types. For example, the shelf 14 is partitioned into five stages in the vertical direction. In the shelf 14, the container 10 and the like can be respectively placed in spaces of the partitioned five stages. In other words, the upper surfaces of partition plates of the shelf 14 respectively function as placement surfaces. The work W is housed on the inside of the container 10. Therefore, for example, it is possible to sort the work W on the placement surfaces for each of types and improve work efficiency. The shelf 14 does not always need to be placed in front of the first robot 40 and only has to be placed in a position where the work W can be imaged by the third imaging section C3. For example, the shelf 14 may be placed on a side surface on the first arm A1 side of the first robot 40.

In drawing out the container 10 from the shelf 14 with the first end effector E1 or the first arm A1 or tilting the container 10 with the first end effector E1 or the first arm A1, when the first force detecting section J1 detects the predetermined output value, the first robot control device 50 may suspend the control for drawing out the container 10 from the shelf 14 or the control for tilting the container 10. Consequently, it is possible to tilt the container 10 without damaging the container 10. Even if the container 10 is caught by the shelf 14 or another container, it is possible to prevent the container 10 from being damaged.

The predetermined output value of the first force detecting section J1 is, for example, 5 to 10 N. The predetermined output value of the first force detecting section J1 may be, for example, approximately 5 N. The predetermined output value of the first force detecting section J1 may be an output value for detecting that the work W on the inside of the container 10 has collapsed. In that case, the collapse of the work W may be notified to the user present around the container 10.

The first end effector E1 holds a grip 12 of the container 10. The first end effector E1 grips the container 10 by pinching and holding the grip 12 of the container 10 with the first finger section F1.

The first arm A1 draws out the container 10 from the shelf 14 in which the container 10 is housed.

The third imaging section C3 images the container 10. The third imaging section C3 images the inside of the container 10. The third imaging section C3 images the external appearance of the container 10.

The first robot control device 50 controls the first robot 40 to draw out the container 10 from the shelf 14 in order to take out the work W on the inside of the container 10 housed in the shelf 14. When the work W on the inside of the drawn-out container 10 cannot be imaged by the third imaging section C3, the first robot control device 50 controls the first robot 40 to tilt the container 10 to enable the third imaging section C3 to image the work W.

The first robot control device 50 controls the first end effector E1 and the first arm A1. After drawing out the container 10 from the shelf 14 with the first arm A1, the first robot control device 50 performs control for tilting the container 10 with respect to the shelf 14 with the first end effector E1 or the first arm A1.

The first imaging section C1 is disposed above the container 10 in the vertical direction. Before performing the control for tilting the container 10 with the first end effector E1 or the first arm A1, the first robot control device 50 may perform control for turning the container 10 around the Y axis with the first end effector E1 or the first arm A1 such that a part the container 10 gripped the first end effector E1 approaches the first imaging section C1. Consequently, the first robot control device 50 moves the work W present in a blind spot 16 shown in FIG. 10 explained below of the third imaging section C3 caused when the container 10 is drawn out from the shelf 14 and facilitates the imaging of the work W by the third imaging section C3. Before performing the control for tilting the container 10 with the first end effector E1 or the first arm A1, the first robot control device 50 may perform control for tilting the container 10 with the first end effector E1 or the first arm A1 in a pitch direction 32 such that the part of the container 10 gripped by the first end effector E1 rises the upward direction, which is the opposite direction of the vertical direction.

Figure 6:
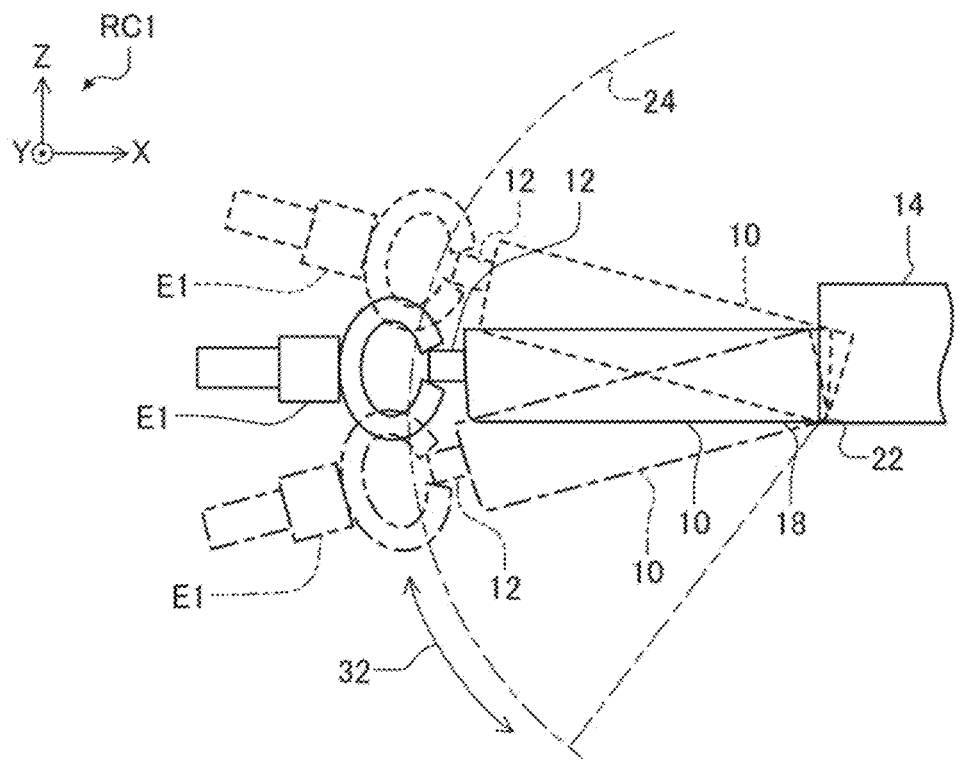
FIG. 6 is a diagram showing tilts in a roll direction and a pitch direction of a container.
Figure 6:
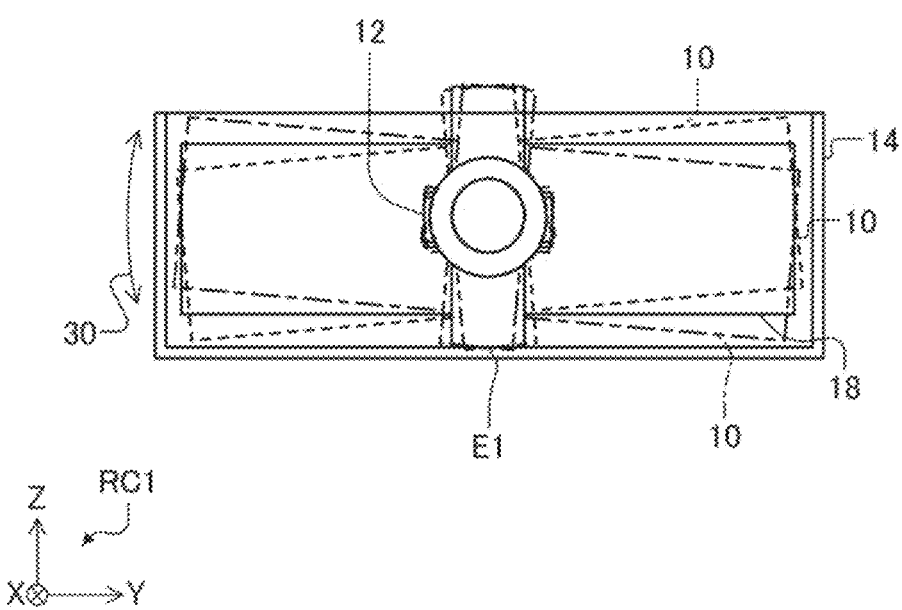

FIG. 6 is a diagram showing tilts in a roll direction and a pitch direction of the container 10.

In the control for tilting the container 10, the first robot system 2 in this embodiment turns the container 10 around the Y axis with the first end effector E1 or the first arm A1 as shown in an upper figure of FIG. 6. In this embodiment, this is referred to as control for tilting the container 10 in the pith direction 32.

In the control for tilting the container 10, the first robot system 2 turns the container 10 around the X axis with the first end effector E1 or the first arm A1 as shown in a lower figure of FIG. 6. In this embodiment, this is referred to as control for tilting the container 10 in a roll direction 30. Consequently, it is possible to easily image the blind spot 16 of the third imaging section C3 caused when the container 10 is drawn out from the shelf 14.

A direction for drawing out the container 10 from the shelf 14 is represented as an X axis, a direction orthogonal to the X axis and parallel to a bottom surface 18 of the container 10 is represented as a Y axis, and a direction orthogonal to the X axis and the Y axis is represented as a Z axis. In the following explanation, a negative direction side of the X axis of the container 10 is sometimes referred to as front or front side and a positive direction side of the X axis is referred to as depth or depth side.

The control for tilting the container 10 is control for locating one side of the container 10 further in the upward direction, which is the opposite direction of the vertical direction, or the downward direction, which is the vertical direction, than the other side and inclining the bottom surface 18 of the container 10. The control for tilting the container 10 is control for lowering the front side of the drawing-out direction of the bottom surface 18 of the container 10 in the downward direction, which is the vertical direction. The control for tilting the container 10 is control for raising the front side of the drawing-out direction of the bottom surface 18 of the container 10 in the upward direction, which is the opposite direction of the vertical direction.

In the control for tilting the container 10, the first end effector E1 or the first arm A1 may move on a track 24 of an arc centering on a fulcrum 22.

The first memory 54 may store, in advance, a distance for drawing out the container 10 from the shelf 14 with the first arm A1. Consequently, it is possible to draw out the container 10 by an appropriate distance. The first memory 54 may store the shape of the container 10.

Imaging Method

An imaging method according to this embodiment is an imaging method by the first robot 40 explained above.

The imaging method includes a gripping step, a drawing-out step, a container imaging step serving as a storing-section imaging step, a normal calculating step, a tilting step, a suspending step, and an inside imaging step.

In the gripping step, the first robot 40 grips the container 10 stored in the shelf 14 with the first end effector E1.

In the drawing-out step, the first robot 40 draws out the container 10 from the shelf 14 with the first arm A1. In the drawing-out step, when the container 10 collides with a not-shown object present around the container 10 and the first force detecting section J1 detects a force in a direction from the object toward the container 10, the first robot 40 may move the container 10 with the first arm A1 in the direction from the object toward the container 10. Consequently, even if the container 10 is caught by the shelf 14 or another container in the drawing-out step, it is possible to prevent the container 10 from being damaged.

In the container imaging step, the first robot 40 images the container 10 with the third imaging section C3.

In the normal calculating step, the first robot 40 detects the bottom surface 18 of the container 10 based on an imaging result in the container imaging step and calculates a direction perpendicular to the bottom surface 18, that is, a normal 26 or a perpendicular. For the detection of the normal 26 of the bottom surface 18 of the container 10, a method such as edge detection, template matching, or three-dimensional object recognition used since the past only has to be used.

In the tilting step, when determining that the normal 26 and an optical axis 34 of the third imaging section C3 are not parallel, the first robot 40 tilts the container 10 with the first end effector E1 or the first arm A1 in a direction for reducing an angle formed by the optical axis 34 and the normal 26.

In the tilting step, the first robot 40 may tilt the container 10 until the angle formed by the optical axis 34 and the normal 26 decreases to 0°. Consequently, it is possible to image the blind spot 16 of the third imaging section C3 caused when the container 10 is drawn out from the shelf 14.

In the tilting step, the first robot 40 uses the depth side of the bottom surface 18 as the fulcrum 22 for tilting the container 10. In the tilting step, the first robot 40 lowers the front side of the drawing-out direction of the container 10 in the downward direction, which is the vertical direction, using the depth side of the bottom surface 18 of the container 10 as the fulcrum 22. In the tilting step, the first robot 40 raises the front side of the drawing-out direction of the container 10 in the upward direction, which is the opposite direction of the vertical direction, using the depth side of the bottom surface 18 of the container 10 as the fulcrum 22. In the tilting step, the first end effector E1 or the first arm A1 may move on the track 24 of the arc centering on the fulcrum 22.

In the tilting step, the first robot 40 tilts the container 10 larger as the interval in the vertical direction between the third imaging section C3 and the container 10 is smaller. In the tilting step, the first robot 40 tilts the container 10 smaller as the distance in the vertical direction between the third imaging section C3 and the container 10 is larger.

In the tilting step, the first robot 40 lowers the front side of the drawing-out direction of the container 10 in the downward direction, which is the vertical direction, larger as the interval in the vertical direction between the third imaging section C3 and the container 10 is smaller. In the tilting step, the first robot 40 lowers the front side of the drawing-out direction of the container 10 in the downward direction, which is the vertical direction, smaller as the interval in the vertical direction between the third imaging section C3 and the container 10 is larger.

In the suspending step, when the first force detecting section J1 detects the predetermined output value in the drawing-out step and the tilting step, the first robot 40 suspends the drawing-out step and the tilting step. The predetermined output value detected by the first force detecting section J1 is, for example, 5 to 10 N. The predetermined output value detected by the first force detecting section J1 may be, for example, approximately 5 N.

The imaging method may include a restoration-from-suspension step. In the restoration-from-suspension step, after the suspending step, the first robot 40 may tilt the container 10 in a direction for increasing the angle formed by the optical axis 34 and the normal 26. Consequently, it is possible to reduce a load applied to the container 10.

In the inside imaging step, the first robot 40 images the inside of the container 10 with the third imaging section C3.

The first robot 40 may repeat the drawing-out step, the tilting step, and the suspending step until the angle formed by the optical axis 34 and the normal 26 reaches a predetermined angle. Consequently, it is possible to tilt the container 10 while preventing the container 10 from dropping from the shelf 14.

The steps are executed by the first robot control device 50.

Figure 7:
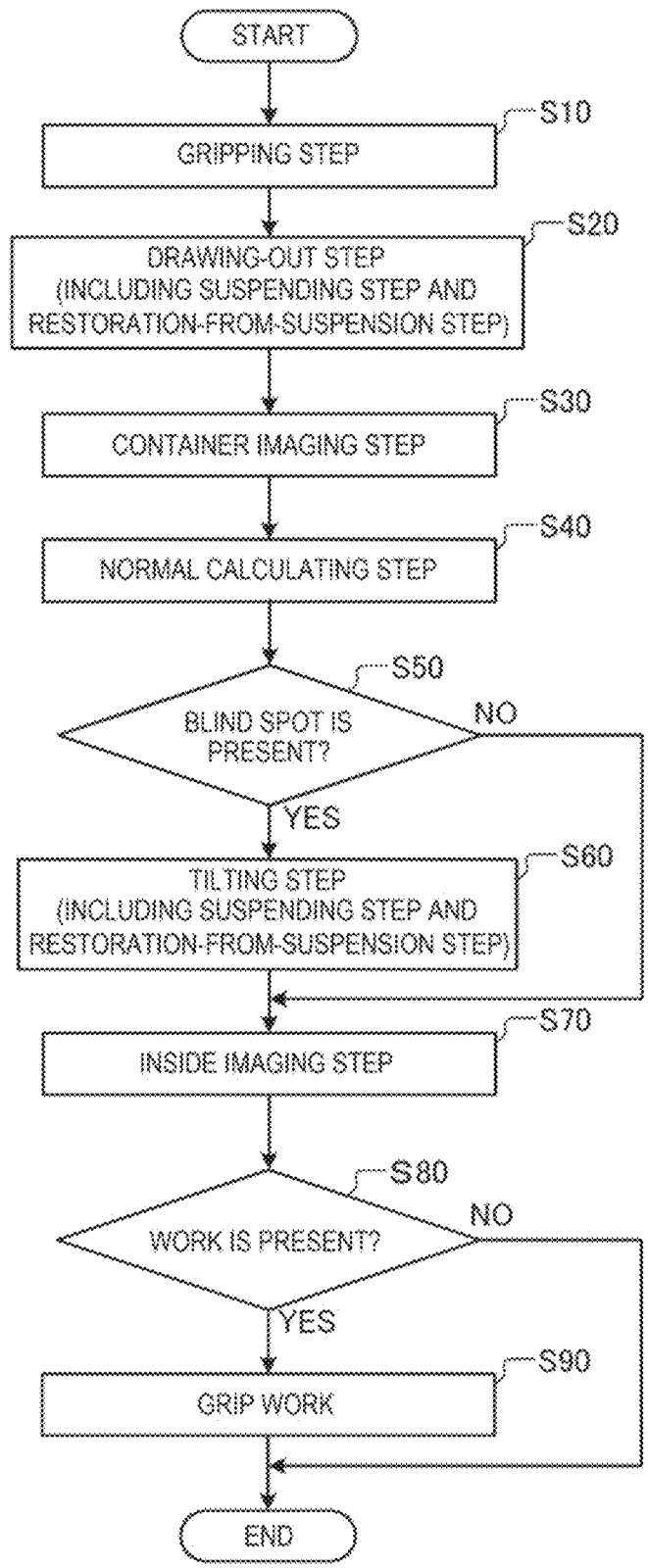
FIG. 7 is a flowchart showing an imaging method of the first robot system according to the first embodiment.
Figure 8:
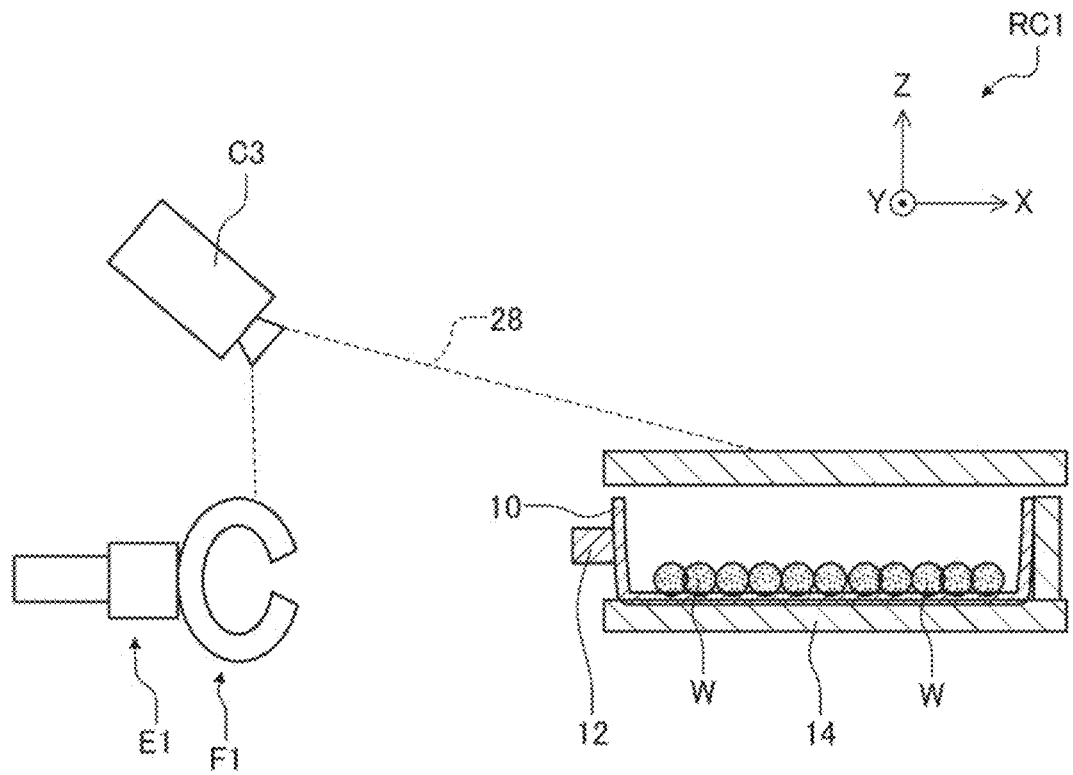
FIG. 8 is a schematic side sectional view showing a positional relation between a third imaging section and the container.
Figure 9:
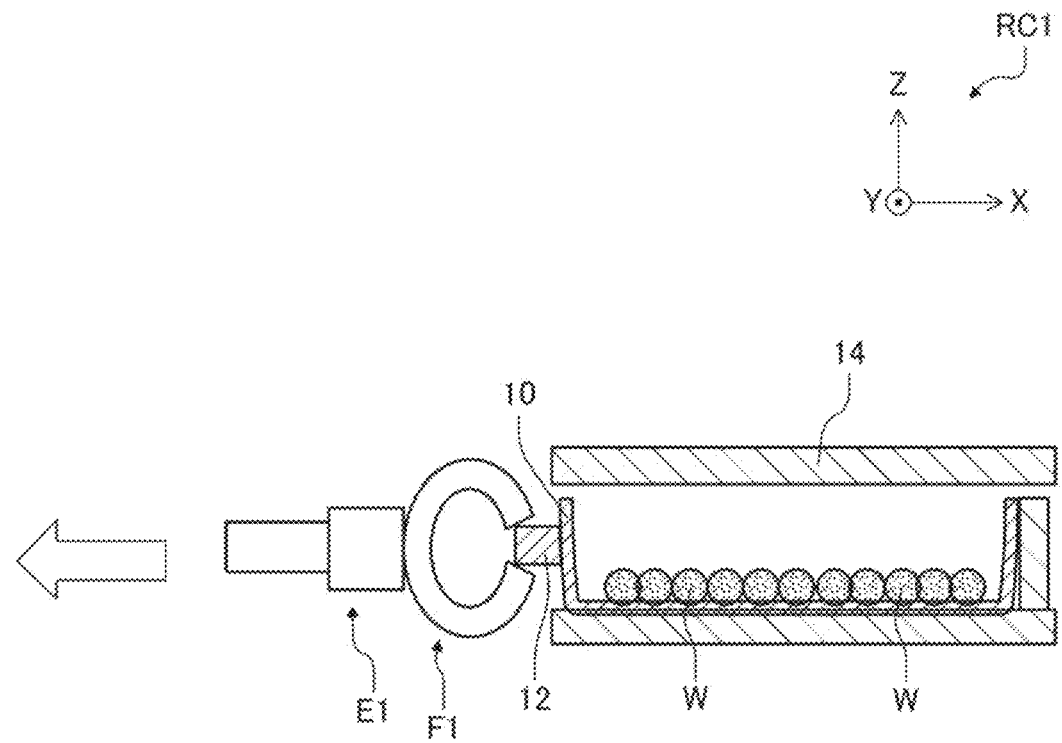
FIG. 9 is a schematic side sectional view showing a state in which a grip of the container is held by a first end effector.
Figure 10:
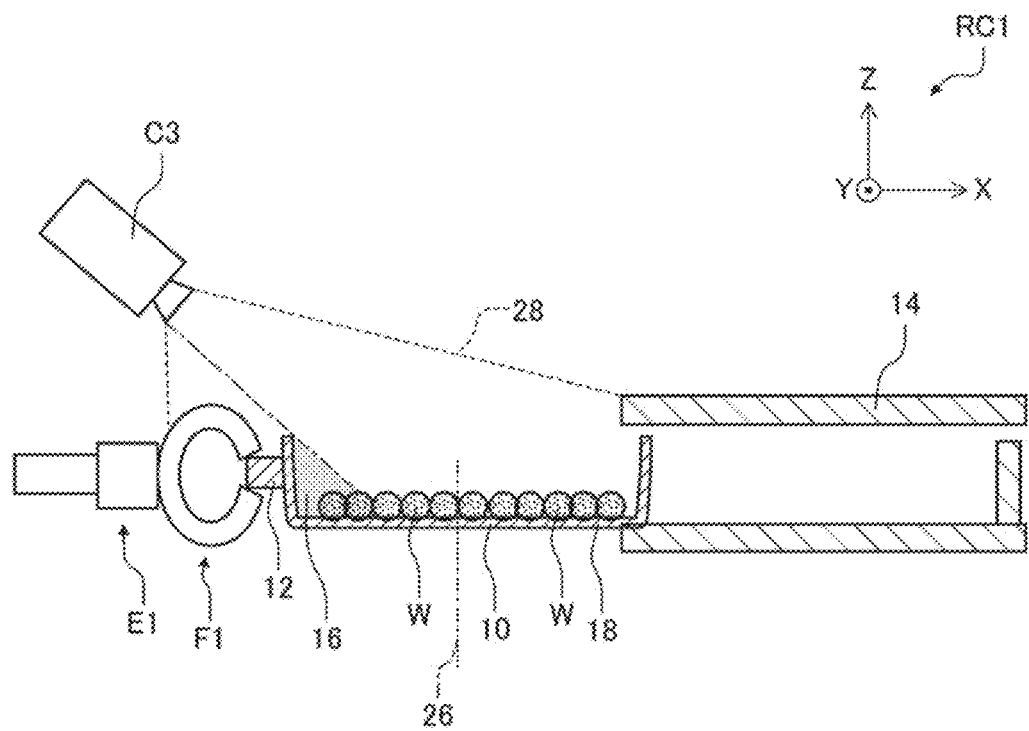
FIG. 10 is a schematic side sectional view showing a positional relation between the third imaging section and the container.
Figure 11:
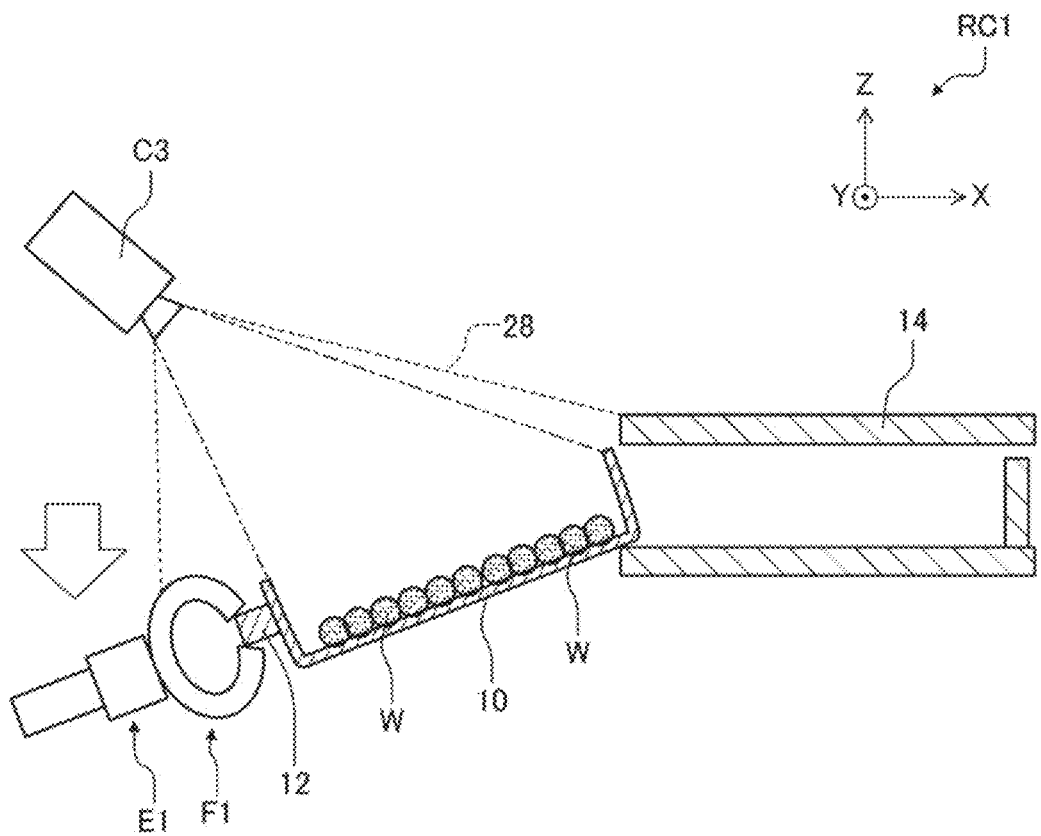
FIG. 11 is a schematic side sectional view showing a positional relation between the third imaging section and the container.

FIG. 7 is a flowchart showing the imaging method of the first robot system according to this embodiment. FIG. 8 is a schematic side sectional view showing a positional relation between the third imaging section C3 and the container 10. Specifically, FIG. 8 shows a positional relation between the third imaging section C3 and the container 10 before being drawn out from the shelf 14. FIG. 9 is a schematic side sectional view showing a state in which the grip 12 of the container 10 is held by the first end effector E1. FIG. 10 is a schematic side sectional view showing a positional relation between the third imaging section C3 and the container 10. Specifically, FIG. 10 shows a positional relation between the third imaging section C3 and the container 10 drawn out from the shelf 14. FIG. 11 is a schematic side sectional view showing a positional relation between the third imaging section C3 and the container 10. Specifically, FIG. 11 shows a positional relation between the third imaging section C3 and the container 10, the front of which is lowered in the downward direction, which is the vertical direction.

As a state before this processing is started, the first robot system 2 is about to image the work W in an imaging region 28 with the third imaging section C3. However, as shown in FIG. 8, the third imaging section C3 cannot image the work W on the inside of the container 10 because the imaging region 28 is blocked by the shelf 14.

First, as shown in FIG. 7, in a gripping step of step S10, the first robot control device 50 controls the first robot 40 to, as shown in FIG. 9, bring the first finger section F1 of the first end effector E1 into contact with the grip 12 and hold the grip 12 with the first finger section F1 of the first end effector E1. The first robot control device 50 shifts to processing in step S20.

Subsequently, in a drawing-out step of step S20, the first robot control device 50 controls the first robot 40 to, as shown in FIGS. 9 and 10, draw out the container 10 from the shelf 14 to bring the container 10 close to a predetermined position. The drawing-out step may include a suspending step and a restoration-from-suspension step. The first robot control device 50 may draw out the container 10 while performing operation for tilting the container 10. The first robot control device 50 shifts to processing in step S30.

Subsequently, in a container imaging step of step S30, the first robot control device 50 controls the third imaging section C3 to, as shown in FIG. 10, image the external appearance of the drawn-out container 10. The first robot control device 50 shifts to processing in step S40.

Subsequently, in a normal calculating step of step S40, the first robot control device 50 detects the bottom surface 18 of the container 10 based on an imaging result in the container imaging step and calculates the normal 26 of the bottom surface 18. The first robot control device 50 shifts to processing in step S50.

Subsequently, in step S50, the first robot control device 50 determines, from a captured image, whether the blind spot 16 of the third imaging section C3 caused when the container 10 is drawn out from the shelf 14 is present.

When determining, as a result of the determination, from the captured image, that the blind spot 16 of the third imaging section C3 caused when the container 10 is drawn out from the shelf 14 is present (YES), the first robot control device 50 shifts to processing in step S60.

On the other hand, when determining, as a result of the determination, from the captured image, that the blind spot 16 of the third imaging section C3 caused when the container 10 is drawn out from the shelf 14 is absent (NO), the first robot control device 50 shifts to processing in step S70.

The blind spot 16 of the third imaging section C3 caused when the container 10 is drawn out from the shelf 14 is a part or a range that cannot be imaged from the position where the third imaging section C3 is present in the container 10 set as an imaging target. If the entire bottom surface 18 of the container 10 can be seen from the third imaging section C3 in the positional relation between the third imaging section C3 and the container 10, the blind spot 16 is considered to be absent.

Subsequently, in a tilting step of step S60, the first robot control device 50 controls the first robot 40 to, as shown in FIG. 11, lower the front side of the drawing-out direction of the container 10 in the downward direction, which is the vertical direction. The first robot control device 50 lowers the front of the container 10 in the downward direction, which is the vertical direction, until the blind spot 16 of the third imaging section C3 caused when the container 10 is drawn out from the shelf 14 is eliminated. The tilting step may include a suspending step and a restoration-from-suspension step. The first robot control device 50 may draw out the container 10 while performing operation for tilting the container 10. The first robot control device 50 shifts to processing in step S70.

Subsequently, in an inside imaging step of step S70, the first robot control device 50 controls the third imaging section C3 to image the work W on the inside of the container 10. The first robot control device 50 shifts to processing in step S80.

Subsequently, in step S80, the first robot control device 50 determines, from the captured image, whether the work W is present on the inside of the container 10.

When determining, as a result of the determination, from the captured image, that the work W is present on the inside of the container 10 (YES), the first robot control device 50 shifts to processing in step S90.

On the other hand, when determining, as a result of the determination, from the captured image, that the work W is absent on the inside of the container 10 (NO), the first robot control device 50 ends this processing.

Subsequently, in step S90, the first robot control device 50 controls the first robot 40 to bring the second finger section F2 of the second end effector E2 into contact with the work W, grip the work W with the second finger section F2 of the second end effector E2, and move the work W from the container 10 to the predetermined position. The first robot control device 50 ends this processing.

According to this embodiment, the blind spot 16 of the third imaging section C3 caused when the container 10 is drawn out from the shelf 14 can be imaged by tilting the container 10.

Second Embodiment

Figure 12:
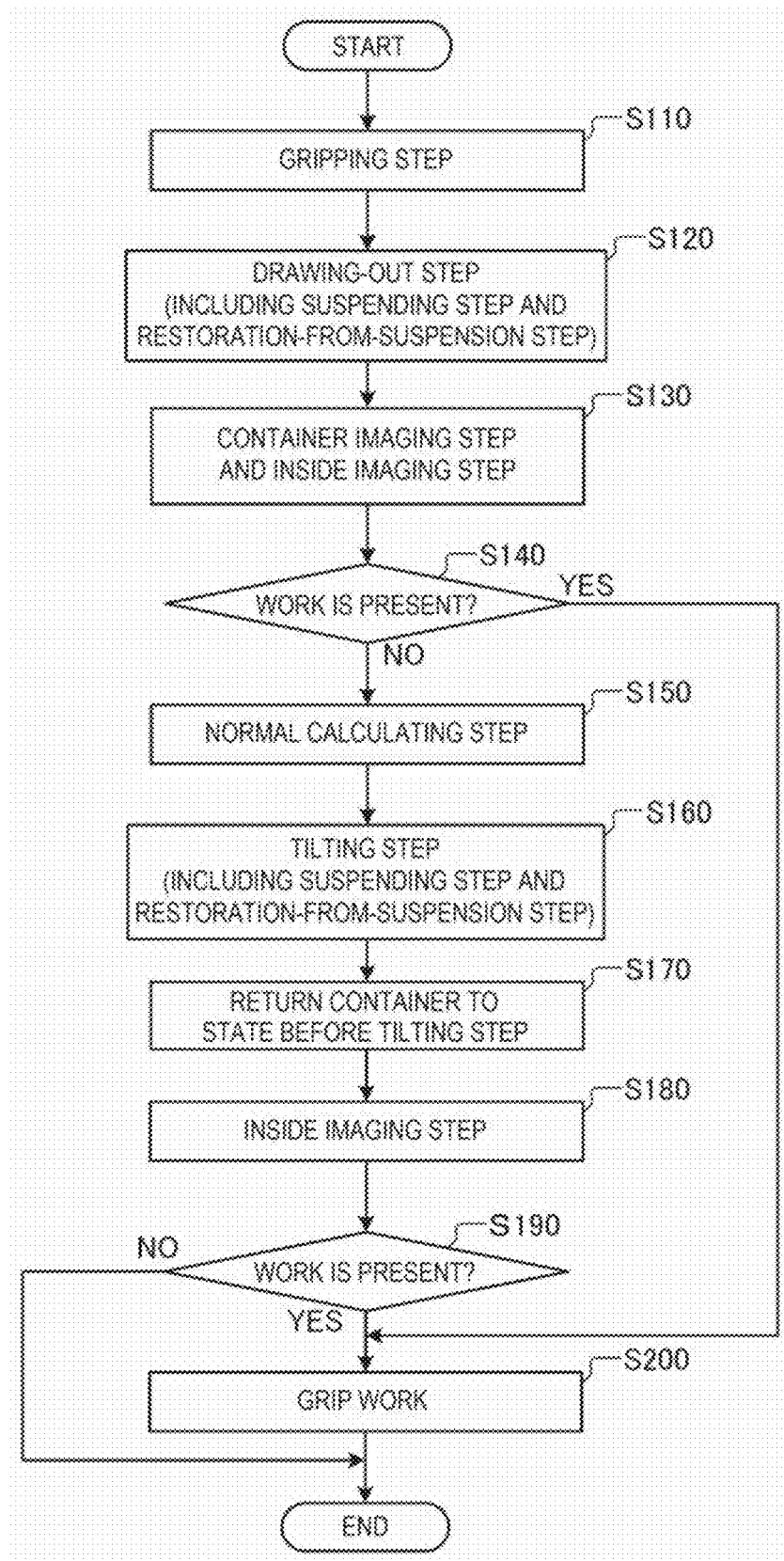
FIG. 12 is a flowchart showing an imaging method of a first robot system according to a second embodiment.
Figure 13:
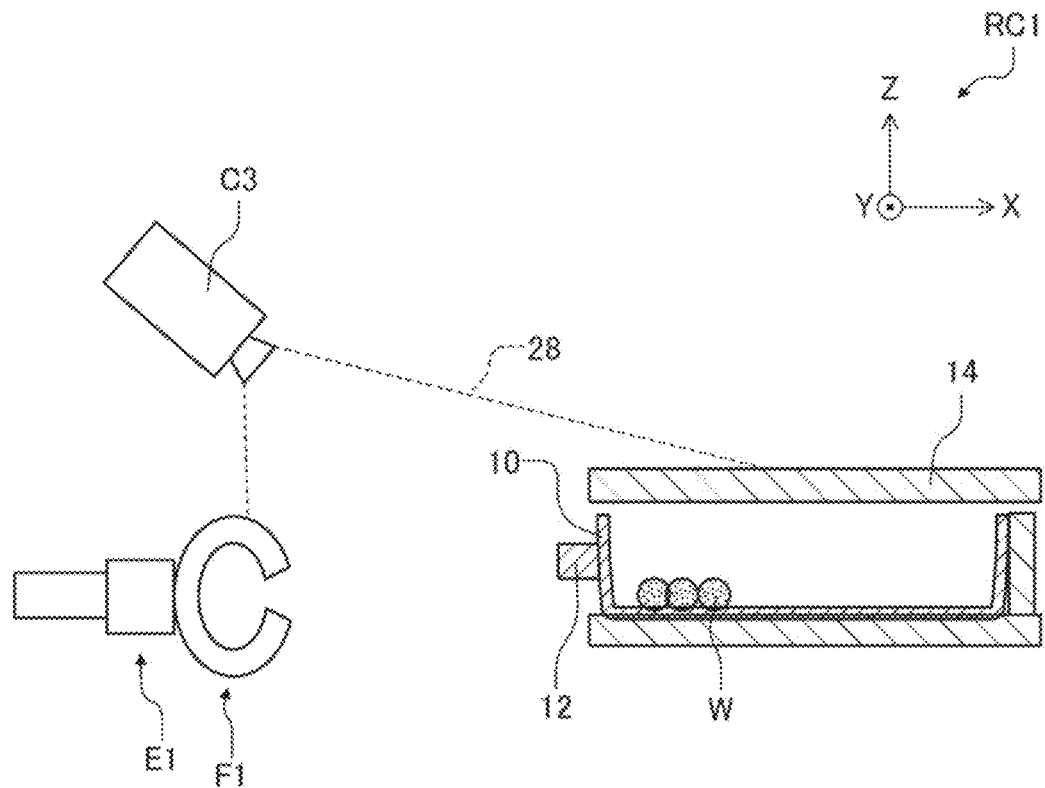
FIG. 13 is a schematic side sectional view showing a positional relation between a third imaging section and a container.
Figure 14:
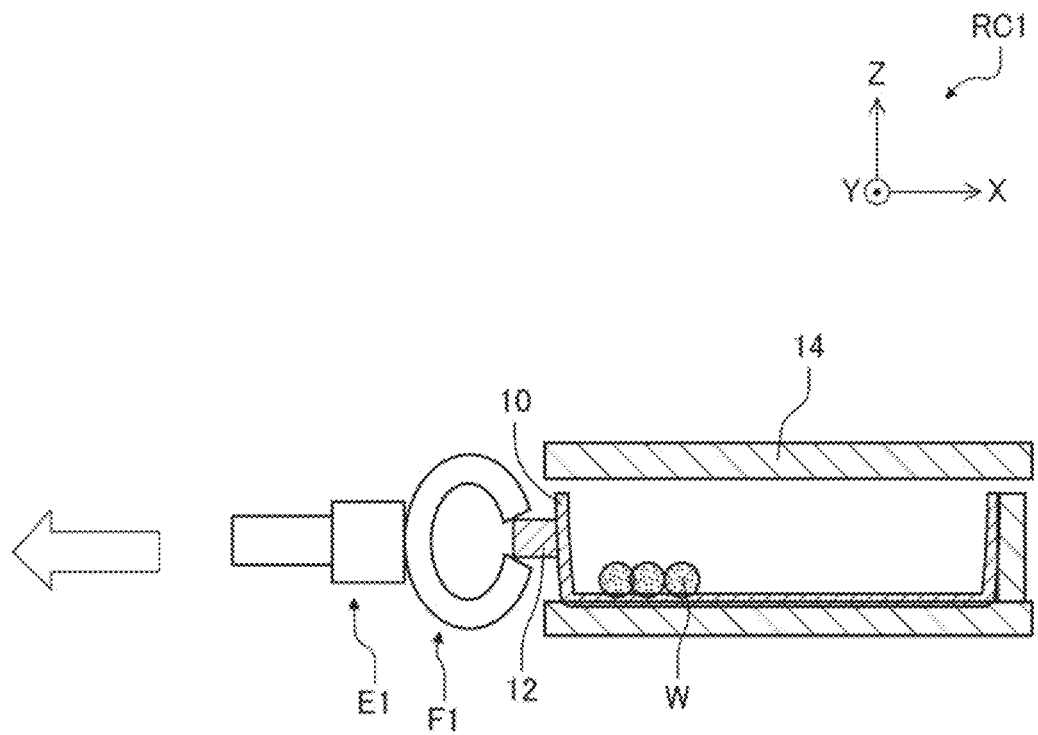
FIG. 14 is a schematic side sectional view showing a state in which a grip of the container is held by a first end effector.
Figure 15:
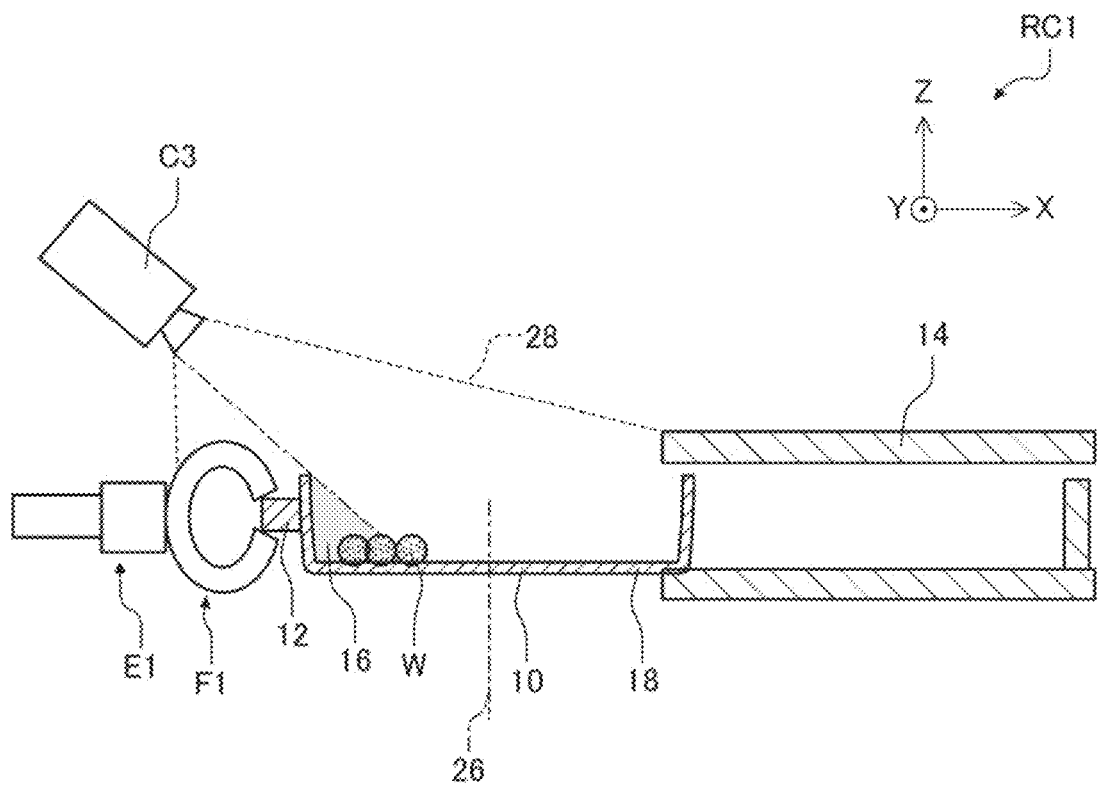
FIG. 15 is a schematic side sectional view showing a positional relation between the third imaging section and the container.
Figure 16:
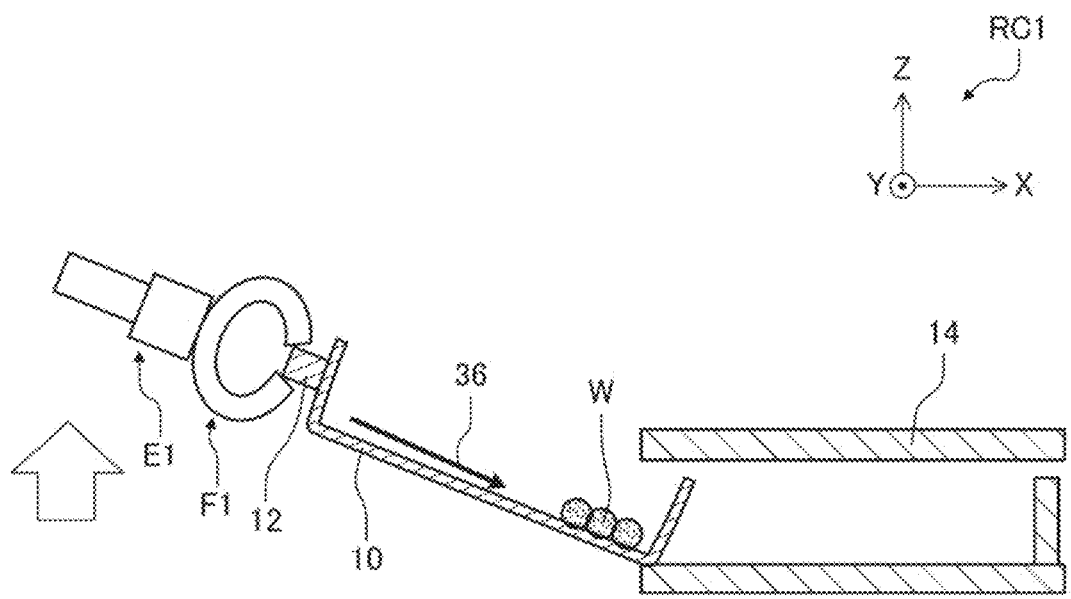
FIG. 16 is a schematic side sectional view showing a positional relation between the third imaging section and the container.
Figure 17:
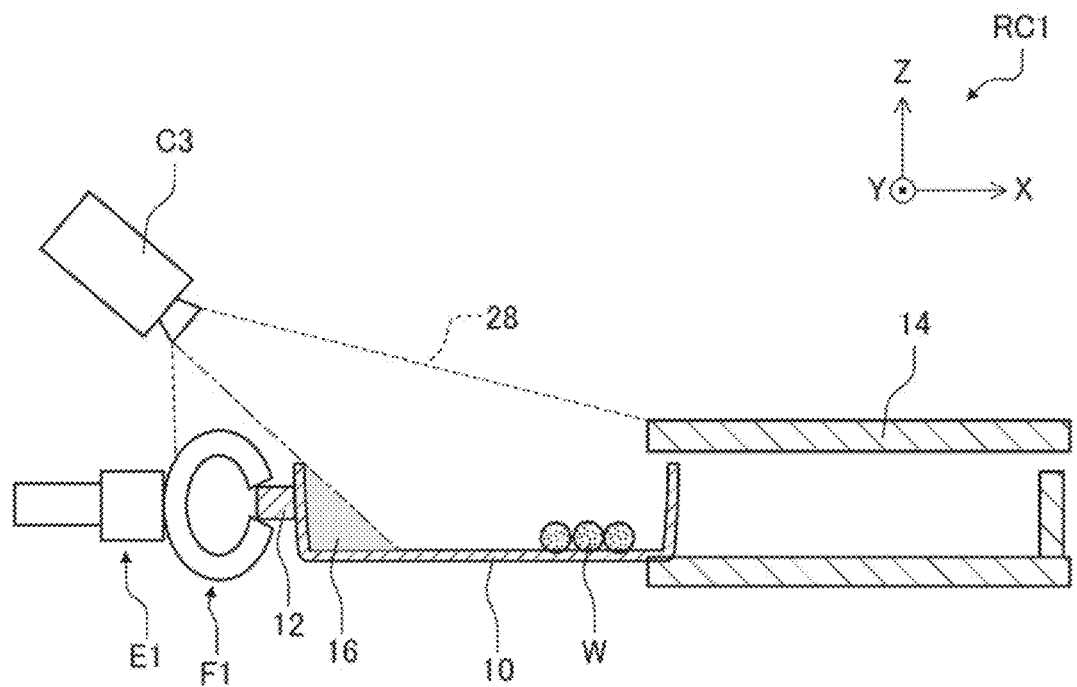
FIG. 17 is a schematic side sectional view showing a positional relation between the third imaging section and the container.

FIG. 12 is a flowchart showing an imaging method of the first robot system 2 according to a second embodiment. FIG. 13 is a schematic side sectional view showing a positional relation between the third imaging section C3 and the container 10. Specifically, FIG. 13 shows a positional relation between the third imaging section C3 and the container 10 before being drawn out from the shelf 14. FIG. 14 is a schematic side sectional view showing a state in which the grip 12 of the container 10 is held by the first end effector E1. FIG. 15 is a schematic side sectional view showing a positional relation between the third imaging section C3 and the container 10. Specifically, FIG. 15 shows a positional relation between the third imaging section C3 and the container 10 drawn out from the shelf 14. FIG. 16 is a schematic side sectional view showing a positional relation between the third imaging section C3 and the container 10. Specifically, FIG. 16 shows a positional relation between the third imaging section C3 and the container 10, the front of which is raised in the upward direction, which is the opposite direction of the vertical direction. FIG. 17 is a schematic side sectional view showing a positional relation between the third imaging section C3 and the container 10. Specifically, FIG. 17 shows a positional relation between the third imaging section C3 and the container 10 returned from a state in which the front is raised.

An imaging method of the first robot 40 is explained with reference to FIGS. 12 to 17.

The first robot 40 according to this embodiment is different from the first robot 40 according to the first embodiment in that the first robot 40 according to this embodiment raises the front side of the drawing-out direction of the container 10 in the upward direction, which is the opposite direction of the vertical direction, and tilts the front side. In the following explanation, the same components as the components in the first embodiment are denoted by the same reference numerals and signs. Explanation of the components is omitted or simplified.

In a state before starting this processing, as shown in FIG. 13, the third imaging section C3 cannot image the work W on the inside of the container 10 because the imaging region 28 is blocked by the shelf 14. The work W is placed on the front side on the inside of the container 10.

First, as shown in FIG. 12, in a gripping step in S110, the first control robot control device 50 controls the first robot 40 to, as shown in FIG. 14, bring the first finger section F1 of the first end effector E1 into contact with the grip 12 and hold the grip 12 with the first finger section F1 of the first end effector E1. The first robot control device 50 shifts to processing in step S120.

Subsequently, in a drawing-out step of step S120, the first robot control device 50 controls the first robot 40 to, as shown in FIG. 15, draw out the container 10 from the shelf 14 to bring the container 10 close to a predetermined position. The drawing-out step may include a suspending step and a restoration-from-suspension step. The first robot control device 50 shifts to processing in step S130.

Subsequently, in a container imaging step and an inside imaging step of step S130, the first robot control device 50 controls the third imaging section C3 to, as shown in FIG. 15, image the external appearance and the inside of the drawn-out container 10. The first robot control device 50 shifts to processing in step S140.

Subsequently, in step S140, the first robot control device 50 determines, from a captured image, whether the work W is present on the inside of the drawn-out container 10.

When determining, as a result of the determination, from the captured image, that the work W is present on the inside of the drawn-out container 10 (YES), the first robot control device 50 shifts to processing in step S200.

On the other hand, when determining, as a result of the determination, from the captured image, that the work W is absent on the inside of the drawn-out container 10 (NO), the first robot control device 50 shifts to processing in step S150.

Subsequently, in a normal calculating step of step S150, the first robot control device 50 detects the bottom surface 18 of the container 10 based on an imaging result in the container imaging step and calculates the normal 26 of the bottom surface 18. The first robot control device 50 shifts to processing in step S160.

Subsequently, in a tilting step of step S160, the first robot control device 50 controls the first robot 40 to, as shown in FIG. 16, raise the front side of the drawing-out direction of the container 10 in the upward direction, which is the opposite direction of the vertical direction. The tilting step may include a suspending step and a restoration-from-suspension step. The work W present on the front side of the container 10 moves in a direction of an arrow 36 according to the movement of the container 10 explained above and is disposed on the depth side of the container 10. The first robot control device 50 shifts to processing in step S170.

Subsequently, in step S170, the first robot control device 50 controls the first robot 40 to, as shown in FIG. 17, returns the container 10 to a state before the tilting step of step S160. The first robot control device 50 shifts to processing in step S180.

Subsequently, in an inside imaging step of step S180, the first robot control device 50 controls the third imaging section C3 to, as shown in FIG. 17, image the work W on the inside of the container 10. The first robot control device 50 shifts to processing in step S190.

Subsequently, in step S190, the first robot control device 50 determines, from a captured image, whether the work W is present on the inside of the container 10.

When determining, as a result of the determination, from the captured image, that the work W is present on the inside of the container 10 (YES), the first robot control device 50 shifts to processing in step S200.

On the other hand, when determining, as a result of the determination, from the captured image, that the work W is absent on the inside of the container 10 (NO), the first robot control device 50 ends this processing.

Subsequently, in step S200, the first robot control device 50 controls the first robot 40 to bring the second finger section F2 of the second end effector E2 into contact with the work W, grip the work W with the second finger section F2 of the second end effector E2, and move the work W from the container 10 to the predetermined position. The first robot control device 50 ends this processing.

Third Embodiment

Figure 18:
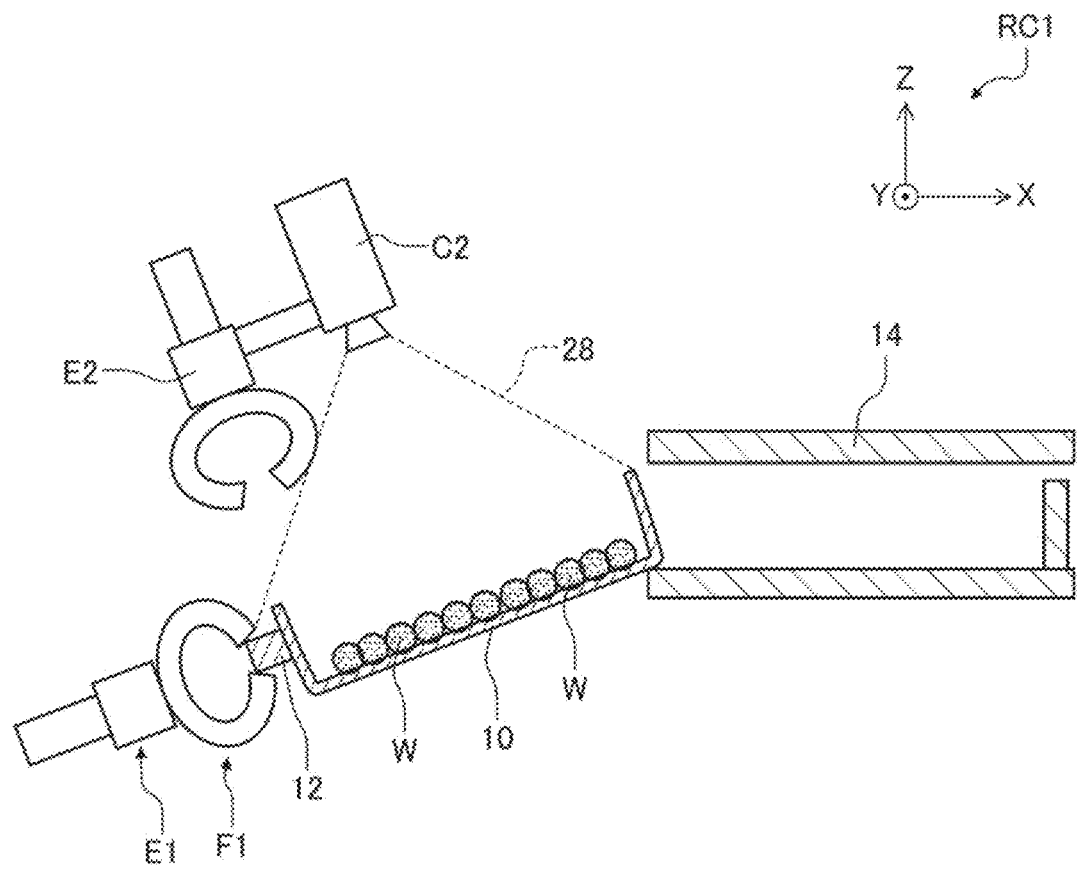
FIG. 18 is a schematic side sectional view showing a positional relation between a second imaging section and a container according to a third embodiment.

FIG. 18 is a schematic side sectional view showing a positional relation between the second imaging section C2 and the container 10 according to a third embodiment. Specifically, FIG. 18 shows a positional relation between the second imaging section C2 and the container 10, the front of which is lowered in the downward direction, which is the vertical direction.

An imaging method of the first robot 40 is explained below with reference to FIG. 18.

The first robot 40 according to this embodiment is different from the first robot 40 according to the first embodiment in that the first robot 40 according to this embodiment images the container 10 with the second imaging section C2. The same components as the components in the first embodiment are denoted by the same reference numerals and signs. Explanation of the components is omitted or simplified.

The first robot 40 according to this embodiment images the container 10 with the second imaging section C2 included in the second manipulator M2 of the second arm A2.

In a tilting step, the first robot control device 50 controls the first robot 40 according to this embodiment to, as shown in FIG. 18, while lowering the front side of the drawing-out direction of the container 10 in the downward direction, which is the vertical direction, with the first end effector E1 or the first arm A1, control the second arm A2 to move the second imaging section C2 to a position where the blind spot 16 of the second imaging section C2 caused when the container 10 is drawn out from the shelf 14 cannot be caused. The first robot control device 50 images the work W on the inside of the container 10 with the second imaging section C2.

Fourth Embodiment

Figure 19:
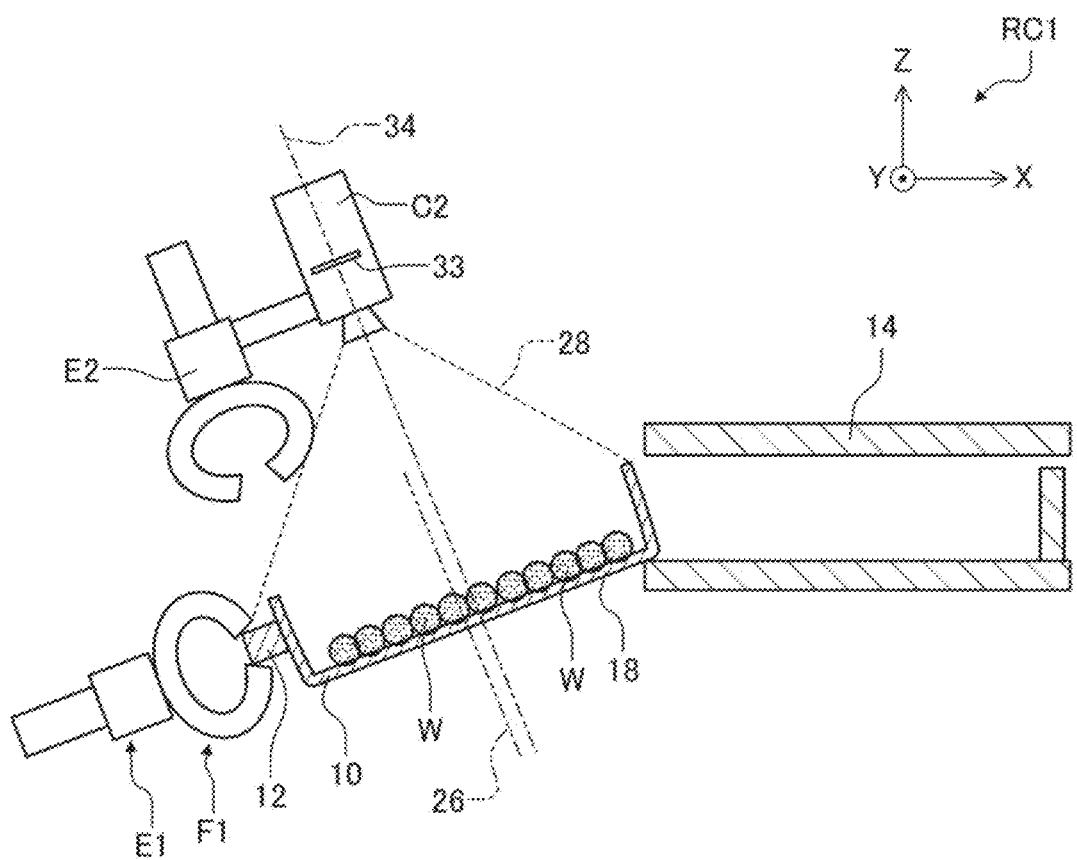
FIG. 19 is a schematic side sectional view showing a positional relation between a second imaging section and a container according to fourth and fifth embodiments.

FIG. 19 is a schematic side sectional view showing a positional relation between the second imaging section C2 and the container 10 according to a fourth embodiment. Specifically, FIG. 19 shows a positional relation between the second imaging section C2 and the container 10, the front of which is lowered in the downward direction, which is the vertical direction.

An imaging method of the first robot 40 is explained below with reference to FIG. 19.

The first robot control device 50 according to this embodiment is different from the first robot control device 50 according to the first embodiment in that, in the tilting step, the first robot control device 50 according to this embodiment controls the first robot 40 to, as shown in FIG. 19, move the second imaging section C2 to a position where the normal 26 of the bottom surface 18 of the container 10 and the optical axis 34 of the second imaging section C2 are parallel (coincide) and the optical axis 34 of the second imaging section C2 is present on the inside of the container 10.

Fifth Embodiment

The first robot control device 50 according to a fifth embodiment is different from the first robot control device 50 according to the fourth embodiment in that, in the tilting step, the first robot control device 50 according to this embodiment controls the first robot 40 to, as shown in FIG. 19, move the second imaging section C2 to a position where an angle formed by the normal 26 of the bottom surface 18 of the container 10 and the optical axis of the second imaging section C2 fits within a predetermined range.

The second imaging section C2 includes an imaging surface 33. The first robot control device 50 may move the second arm A2 in a direction for reducing the angle formed by the optical axis 34, which is a straight line orthogonal to the imaging surface 33, and the normal 26 of the bottom surface 18 of the container 10. Consequently, it is possible to reduce an amount for tilting the container 10.

Modification

Figure 20:
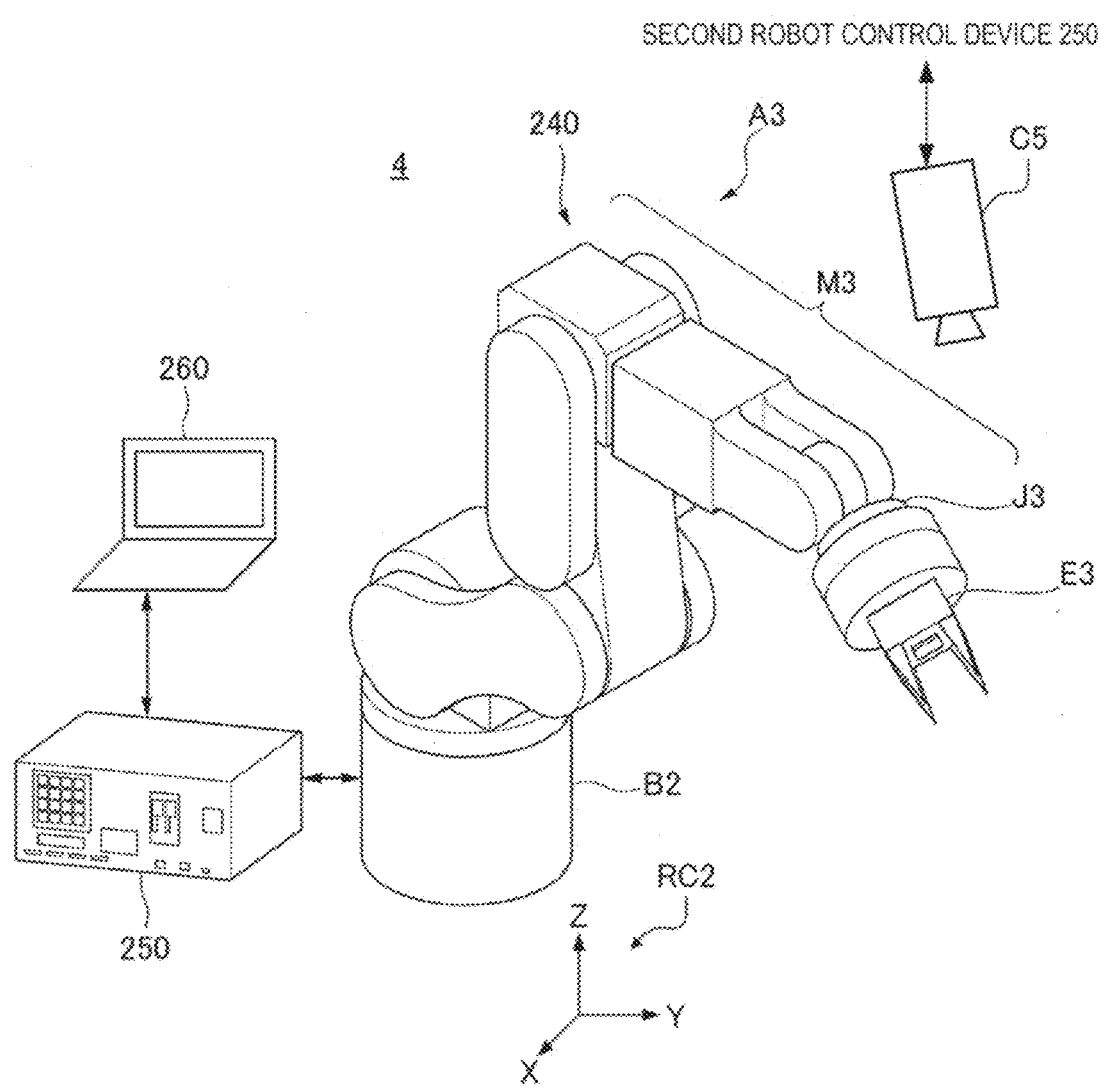
FIG. 20 is a diagram showing an example of the configuration of a second robot system according to a modification.

FIG. 20 is a diagram showing an example of the configuration of a second robot system 4 according to a modification. In FIG. 20, as in FIG. 1, a second robot coordinate system RC2 is shown.

The second robot system 4 functioning as a robot system in this modification includes a second robot 240 functioning as a robot, a second information processing device 260, a second robot control device 250 functioning as a control section, and a fifth imaging section C5 functioning as an imaging section.

The second robot 240 includes a second supporting stand B2 and a third arm A3 functioning as a first arm.

The third arm A3 includes a third manipulator M3, a third end effector E3 functioning as a gripping section, and a third force detecting section J3 functioning as a force detecting section.

In the example shown in FIG. 20, the second robot system 4 includes the second robot 240, which is a single-arm robot, instead of the first robot 40, which is the double-arm robot.

As shown in FIG. 20, the second robot 240 is the single-arm robot in which the third arm A3 is supported by the second supporting stand B2. Unlike the first robot 40, the second robot 240 is controlled by the second robot control device 250 set on the outside.

The second robot 240 is the single-arm robot including the third arm A3 and the second supporting stand B2 that supports the third arm A3.

The third arm A3 includes the third end effector E3, the third manipulator M3, and the third force detecting section J3.

The third end effector E3 is an end effector that holds the grip 12 of the container 10 and the work W. In the example shown in FIG. 20, the third end effector E3 includes a finger section and pinches the grip 12 of the container 10 and the work W with the finger section to thereby hold the grip 12 and of the container 10 and the work W.

The third manipulator M3 includes six joints. The six joints respectively include not-shown actuators. In other words, the third arm A3 including the third manipulator M3 is a six-axis vertical articulated arm. The third arm A3 performs operation of a degree of freedom of six axes according to cooperated operation by the second supporting stand B2, the third end effector E3, the third manipulator M3, and the actuators of the respective six joints included in the third manipulator M3. The third arm A3 may be configured to operate at a degree of freedom of five or less axes or may be configured to operate at a degree of freedom of seven or more axes.

The third force detecting section J3 is provided between the third end effector E3 and the third manipulator M3. The third force detecting section J3 is, for example, a force sensor. The third force detecting section J3 detects an external force acting on the third end effector E3 or an external force acting on an object held by the third end effector E3. The third force detecting section J3 may be a torque sensor that detects the external force acting on the third end effector E3 or the external force acting on an object held by the third end effector E3.

Each of functional sections (that is, the third end effector E3, the third manipulator M3, the fifth imaging section C5, and the third force detecting section J3) included in the second robot 240 is communicably connected to the second robot control device 250 by a cable. Consequently, each of the functional sections performs operation based on a control signal acquired from the second robot control device 250. Wired communication via the cable is performed according to a standard such as Ethernet (registered trademark) or USB. A part or all of the functional sections may be coupled to the second robot control device 250 by wireless communication performed according to a communication standard such as Wi-Fi.

The fifth imaging section C5 images the external appearance and the inside of the container 10, the work W, and the like. The fifth imaging section C5 is, for example, a camera including a CCD, a CMOS, or the like as an imaging element that converts condensed light into an electric signal.

A program for realizing a function of any component in any device such as the first robot control device 50 or the second robot control device 250 explained above may be recorded (stored) in a computer-readable recording medium (storage medium). A computer system may be caused to read and execute the program. The "computer system" includes an operating system (OS) or hardware such as peripheral devices. The "computer-readable recording medium" means a portable medium such as a flexible disk, a magneto-optical disk, a ROM (Read Only Memory), or a CD (Compact Disc)-ROM, a storage device such as a hard disk incorporated in the computer system, or the like. Further, the "computer-readable recording medium" includes a recording medium that retains a program for a fixed time like a volatile memory (a RAM: Random Access Memory) inside a computer system functioning as a server or a client when the program is transmitted via a network such as the Internet or a communication line such as a telephone line.

The program may be transmitted from a computer system, in which the program is stored in a storage device or the like, to another computer system via a transmission medium or by a transmission wave in the transmission medium. The "transmission medium", which transmits the program, means a medium having a function of transmitting information like a network (a communication network) such as the Internet or a communication line (a communication wire) such as a telephone line.

The program may be a program for realizing a part of the functions explained above. Further, the program may be a program that can realize the functions explained above in combination with a program already recorded in the computer system, a so-called differential file (a differential program).

The embodiments of the present disclosure are explained in detail above with reference to the drawings. However, a specific configuration is not limited to the embodiments and includes design and the like in a range not departing from the gist of the present disclosure.

Contents derived from the embodiments are described below.

A robot system includes: a gripping section configured to grip a storing section; a first arm in which the gripping section is provided, the first arm drawing out the storing section from a shelf in which the storing section is housed; a force detecting section provided in the first arm and configured to detect force applied to the gripping section; an imaging section configured to image the storing section; and a control section configured to control the gripping section and the first arm. The control section performs control for drawing out the storing section from the shelf with the first arm and thereafter tilting the storing section with respect to the shelf with the gripping section or the first arm.

Consequently, it is possible to image, by tilting the storing section, a blind spot of the imaging section caused when the storing section is drawn out from the shelf.

In the robot system, in drawing out the storing section from the shelf with the first arm or tilting the storing section with the gripping section or the first arm, when the force detecting section detects a predetermined output value, the control section may suspend the control for drawing out the storing section from the shelf or the control for tilting the storing section.

Consequently, it is possible to tilt the storing section without damaging the storing section. It is possible to prevent the storing section from being damaged even if the storing section is caught by the shelf or another storing section.

In the robot system, when a direction for drawing out the storing section from the shelf is represented as an X axis, a direction orthogonal to the X axis and parallel to a bottom surface of the storing section in a state in which the storing section is housed in the shelf is represented as a Y axis, and a direction orthogonal to the X axis and the Y axis is represented as a Z axis, in the control for tilting the storing section, the control section may turn the storing section around the X axis or turn the storing section around the Y axis with the gripping section or the first arm.

Consequently, it is possible to easily image a blind spot of the imaging section caused when the storing section is drawn out from the shelf.

In the robot system, the imaging section may be disposed above the storing section in a vertical direction, and, before performing the control for tilting the storing section with the gripping section or the first arm, the control section may perform control for turning, with the gripping section or the first arm, the storing section around the Y axis such that a part of the storing section gripped by the gripping section approaches the imaging section.

Consequently, for example, work present in a blind spot of the imaging section caused when the storing section is drawn out from the shelf is moved. Imaging of the work by the imaging section is facilitated.

In the robot system, the robot system may further include a storing section in which a distance for drawing out the storing section from the shelf with the first arm is stored in advance.

Consequently, it is possible to draw out the storing section by an appropriate distance.

In the robot system, the robot system may further include a second arm in which the imaging section is provided, the imaging section may include an imaging surface, and the control section may move the second arm in a direction for reducing an angle formed by a straight line orthogonal to the imaging surface and a normal of the bottom surface of the storing section.

Consequently, it is possible to reduce an amount for tilting the storing section.

An imaging method is an imaging method by a robot including a gripping section configured to grip a storing section, a first arm in which the gripping section is provided, the first arm drawing out the storing section from a shelf in which the storing section is housed, a force detecting section provided in the first arm and configured to detect force applied to the gripping section, and an imaging section configured to image the storing section, the imaging method including: gripping, with the gripping section, the storing section housed in the shelf; drawing out the storing section from the shelf with the first arm; imaging the storing section with the imaging section; detecting a bottom surface of the storing section based on a result of the imaging and calculating a normal of the bottom surface; tilting, when it is determined that the normal and an optical axis of the imaging section are not parallel, with the gripping section or the first arm, the storing section in a direction for reducing an angle formed by the optical axis and the normal; suspending the drawing out and the tilting when the force detecting section detects a predetermined output value in the drawing out and the tilting; and imaging an inside of the storing section with the imaging section.

Consequently, it is possible to image, by tilting the storing section, a blind spot of the imaging section caused when the storing section is drawn out from the shelf.

In the imaging method, in the tilting, the storing section may be tilted until the angle formed by the optical axis and the normal is reduced to 0°.

Consequently, it is possible to image a blind spot of the imaging section caused when the storing section is drawn out from the shelf.

In the imaging method, the imaging method may further include restoring, after the suspending, the storing section from the suspension of the tilting and tilting the storing section in a direction for increasing the angle formed by the optical axis and the normal.

Consequently, it is possible to reduce a load applied to the storing section.

In the imaging method, the drawing out, the tilting, and the suspending may be repeated until the angle formed by the optical axis and the normal reaches a predetermined angle.

Consequently, it is possible to tilt the storing section while preventing the storing section from dropping from the shelf.

In the imaging method, in the drawing out, when the storing section collides with an object around the storing section and a force in a direction from the object toward the storing section is detected by the force detecting section, the storing section may be moved in the direction from the object toward the storing section by the first arm.

Consequently, it is possible to prevent the storing section from being damaged even if the storing section is caught by the shelf or another storing section in the drawing out.

What is claimed is:

1. A robot system comprising:
a gripping section configured to grip a storing section;
a first arm in which the gripping section is provided, the first arm drawing out the storing section from a shelf in which the storing section is housed;
a force detecting section provided in the first arm and configured to detect force applied to the gripping section;
an imaging section configured to image the storing section; and
a control section configured to control the gripping section and the first arm, wherein
the control section performs control for drawing out the storing section from the shelf with the first arm and thereafter tilting the storing section with respect to the shelf with the gripping section or the first arm,
when a direction for drawing out the storing section from the shelf is represented as an X axis, a direction orthogonal to the X axis and parallel to a bottom surface of the storing section in a state in which the storing section is housed in the shelf is represented as a Y axis, and a direction orthogonal to the X axis and the Y axis is represented as a Z axis, and
in the control for tilting the storing section, the control section turns the storing section around the X axis or turns the storing section around the Y axis with the gripping section or the first arm.

2. The robot system according to claim 1, wherein, while drawing out the storing section from the shelf with the first arm, when the force detecting section detects a predetermined output value, the control section suspends the control for drawing out the storing section from the shelf and, while tilting the storing section with the gripping section or the first arm, when the force detecting section detects the predetermined output value, the control section suspends the control for tilting the storing section.

3. The robot system according to claim 1, wherein
the imaging section is disposed above the storing section in a vertical direction, and
before performing the control for tilting the storing section with the gripping section or the first arm, the control section performs control for turning, with the gripping section or the first arm, the storing section around the Y axis such that a part of the storing section gripped by the gripping section approaches the imaging section.

4. The robot system according to claim 1, further comprising a memory in which a distance for drawing out the storing section from the shelf with the first arm is stored in advance.

5. The robot system according to claim 1, further comprising a second arm in which the imaging section is provided, wherein
the imaging section includes an imaging surface, and
the control section moves the second arm in a direction for reducing an angle formed by a straight line orthogonal to the imaging surface and a normal of the bottom surface of the storing section.

6. An imaging method by a robot including a gripping section configured to grip a storing section, a first arm in which the gripping section is provided, the first arm drawing out the storing section from a shelf in which the storing section is housed, a force detecting section provided in the first arm and configured to detect force applied to the gripping section, and an imaging section configured to image the storing section,
the imaging method comprising:
gripping, with the gripping section, the storing section housed in the shelf;
drawing out the storing section from the shelf with the first arm;
imaging the storing section with the imaging section;
detecting a bottom surface of the storing section based on a result of the imaging and calculating a normal of the bottom surface;
tilting, when it is determined that the normal and an optical axis of the imaging section are not parallel, with the gripping section or the first arm, the storing section in a direction for reducing an angle formed by the optical axis and the normal;

suspending the drawing out and the tilting when the force detecting section detects a predetermined output value in the drawing out and the tilting; and imaging an inside of the storing section with the imaging section.

7. The imaging method according to claim 6, wherein, in the tilting, the storing section is tilted until the angle formed by the optical axis and the normal is reduced to 0°.

8. The imaging method according to claim 6, further comprising restoring, after the suspending, the storing section from the suspension of the tilting and tilting the storing section in a direction for increasing the angle formed by the optical axis and the normal.

9. The imaging method according to claim 8, wherein the drawing out, the tilting, and the suspending are repeated until the angle formed by the optical axis and the normal reaches a predetermined angle.

10. The imaging method according to claim 6, wherein, in the drawing out, when the storing section collides with an object around the storing section and a force in a direction from the object toward the storing section is detected by the force detecting section, the first arm is moved in the direction from the object toward the storing section.

\* \* \* \* \*